United States Patent [19]
Sakimoto et al.

[11] Patent Number: 4,778,971
[45] Date of Patent: Oct. 18, 1988

[54] INDUCTION HEATING APPARATUS

[75] Inventors: Yukio Sakimoto, Ohta; Yuji Ishizaka, Yokosuka; Takao Ohno, Ohta, all of Japan

[73] Assignee: Kabushiki Kaisha Meidensha, Tokyo, Japan

[21] Appl. No.: 53,113

[22] Filed: May 21, 1987

[30] Foreign Application Priority Data

| May 23, 1986 | [JP] | Japan | 61-118934 |
| May 23, 1986 | [JP] | Japan | 61-118938 |
| Nov. 21, 1986 | [JP] | Japan | 61-179132[U] |
| Nov. 28, 1986 | [JP] | Japan | 61-182902[U] |
| Dec. 3, 1986 | [JP] | Japan | 61-186448[U] |
| Jan. 14, 1987 | [JP] | Japan | 62-7145 |
| Jan. 30, 1987 | [JP] | Japan | 62-20240 |
| Apr. 7, 1987 | [JP] | Japan | 62-85582 |

[51] Int. Cl.$^4$ .............................................. H05B 6/40
[52] U.S. Cl. ..................... 219/10.61 R; 219/10.71; 219/10.79; 219/10.43
[58] Field of Search .......... 219/10.71, 10.69, 10.61 R, 219/10.79, 10.43, 10.75; 34/1

[56] References Cited

U.S. PATENT DOCUMENTS

| 3,562,470 | 2/1971 | Bobart et al. | 219/10.43 |
| 3,699,302 | 10/1972 | Griffith | 219/10.71 X |
| 3,840,138 | 10/1974 | Mohr | 219/10.71 X |
| 4,054,770 | 10/1977 | Jackson et al. | 219/10.61 R |
| 4,315,124 | 2/1982 | Granstrom et al. | 219/10.75 X |

Primary Examiner—Philip H. Leung
Attorney, Agent, or Firm—Bachman & LaPointe

[57] ABSTRACT

An induction heating apparatus for utilizing electromagnetic induction to heat a workpiece. The apparatus includes a pair of heating coil units disposed in spaced-parallel relation to permit transportion of the workpiece between the heating coil units. Each of the heating coil units includes a main heating coil and an auxiliary heating coil disposed at a position adjacent to the main heating coil. The main heating coil has a plurality of spaced-parallel transverse conductors connected in series and produces magnetic field crossing the workpiece, causing heating when supplied with a high- or intermediate-frequency alternating current. The auxiliary heating coil includes a pair of series connected longitudinal conductors placed at positions facing to the workpiece at a small distance inside from the respective opposite side edges of the workpiece. The auxiliary heating coil is supplied with a high- or intermediate-frequency alternating current to heat the workpiece in a manner to compensate the temperature ununiformity provided by the main heating coil so as to provide good temperature uniformity over the full width of the workpiece.

29 Claims, 29 Drawing Sheets

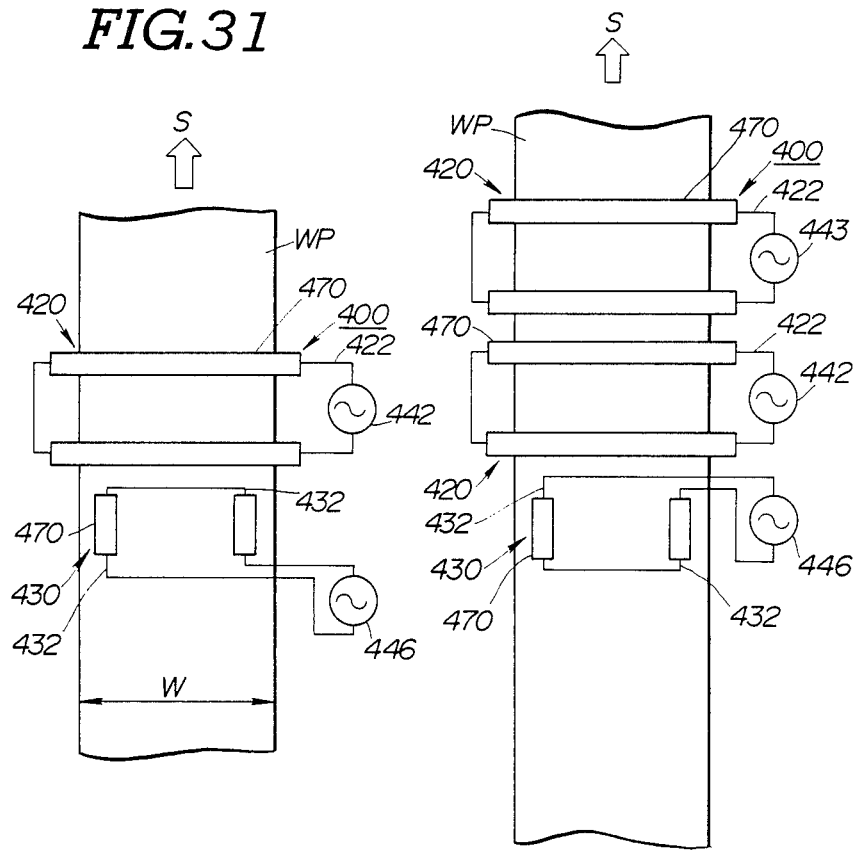

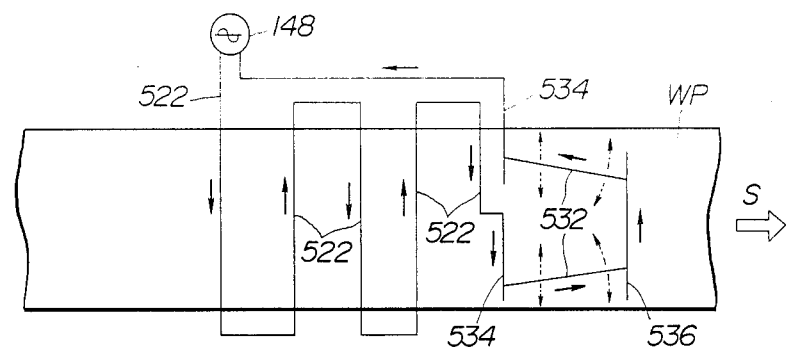
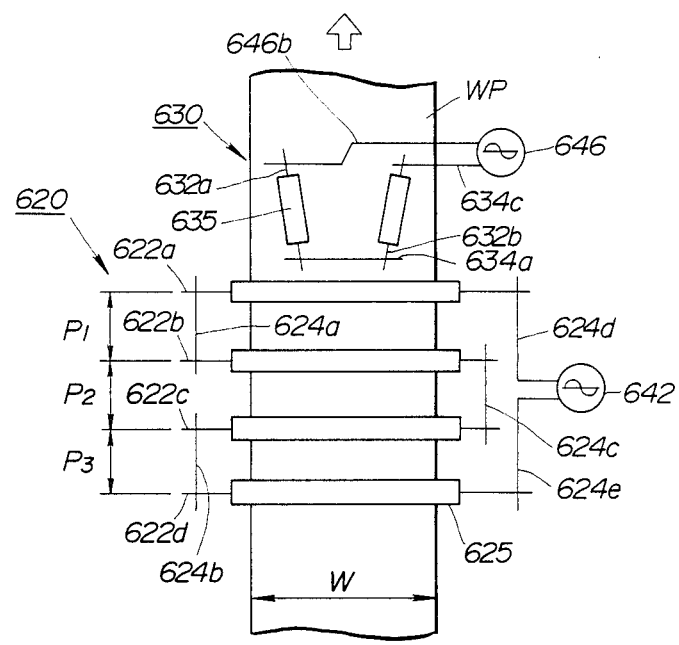

1

INDUCTION HEATING APPARATUS

BACKGROUND OF THE INVENTION

This invention relates to an induction heating apparatus for utilizing electromagnetic induction to heat a workpiece and, more particularly, to an induction heating apparatus of the transverse flux heating type which is used to heat a workpiece transported through the induction heating apparatus by producing magnetic flux crossing the workpiece in a direction substantially perpendicular to the surface of the workpiece. It will be appreciated that the term "workpiece" as used throughout this invention is intended to include metal strips, metal sheets, metal plates, and other conductive thin members.

Induction heating apparatus have been employed in drying, hardening, annealing, preheating, and other heating processes whereby heat is generated within the part to be treated by electromagnetic induction. A rapidly alternating magnetic field is produced in a pair of specially designed heating coil units between which a workpiece is transported at a predetermined speed. The magnetic field induces an electric potential in the workpiece, causing heating because of $I^2R$ losses. For this purpose, the heating coil units are supplied with a high- or intermediate-frequency alternating current from a suitable power source. High frequency is generally used for shallow heating, while intermediate frequency is used for applications requiring deeper heating.

One example of the heating coil unit used in conventional induction heating apparatus includes a pair of heating coil units disposed in spaced-parallel relation to permit transportation of the workpiece in a direction between the heating coil units, each of the heating coil units including a plurality of spaced-parallel transverse conductors extending in a direction substantially perpendicular to the direction of transportation of the workpiece. The transverse conductors are connected in series and supplied with a high- or intermediate-frequency alternating current to produce a rapidly alternating magnetic field crossing the workpiece in a direction perpendicular to the surface of the workpiece.

One problem associated with such conventional induction heating apparatus is that the heated workpiece has a temperature not uniform over its width. Particularly, the workpiece temperature has troughs at positions somewhat inner from the opposite side edges of the workpiece, causing undesirable effects in the following workpiece processing steps. It is very difficult to provide uniform temperature over the full width of the workpiece even with adjustments of the length of the transverse conductors.

SUMMARY OF THE INVENTION

A main object of the invention is to provide an improved induction heating apparatus which can heat a workpiece with good temperature uniformity over the full width of the workpiece.

It is another object of the invention to provide an induction heating apparatus applicable to workpieces of different widths.

There is provided, in accordance with the invention, an induction heating apparatus of a transverse flux heating type for utilizing electromagnetic induction to heat a workpiece transported through the apparatus in a direction. The apparatus comprises a power source unit for supplying alternating current at a predetermined frequency. The apparatus also includes at least one sets of a main heating coil unit having a pair of heating coils disposed in spaced-parallel relation to permit transportation of the workpiece between the main heating coils, and an auxiliary heating coil unit having a pair of auxiliary heating coils disposed in spaced-parallel relation to permit transportation of the workpiece between the auxiliary heating coils. Each of the main heating coil has a plurality of transverse conductors extending in a longitudinal direction substantially perpendicular to the direction of transportation of the workpiece. The transverse conductors have a length longer than the width of the workpiece. The transverse conductors are connected in series with the power source unit for producing magnetic field crossing the workpiece. Each of the auxiliary heating coil has first and second longitudinal conductors extending in a transverse direction substantially the same as the direction of transportation of the workpiece with a transverse distance shorter than the width of the workpiece. The first longitudinal conductor is placed at a position facing to the workpiece at a small distance inside from one of the side edges of the workpiece. The second longitudinal conductor is placed at a position facing to the workpiece at a small distance inside from the other side edge of the workpiece. The first and second longitudinal conductors are connected in series with the power supply unit for producing magnetic field crossing the workpiece.

BRIEF DESCRIPTION OF THE DRAWINGS

This invention will be described in greater detail by reference to the following description taken in connection with the accompanying drawings, in which like numerals identify like elements in the several figures and in which:

FIG. 31 is a schematic plan view showing a fifth embodiment of the heating coil unit of the invention;

FIG. 33 is a schematic plan view showing a modified form of the heating coil unit of FIG. 31;

FIG. 41 is a schematic plan view showing another modified form of the heating coil unit of FIG. 36;

FIG. 43 is a schematic plan view showing a modified form of the heating coil unit of FIG. 42A.

DETAILED DESCRIPTION OF THE INVENTION

Figure 1:
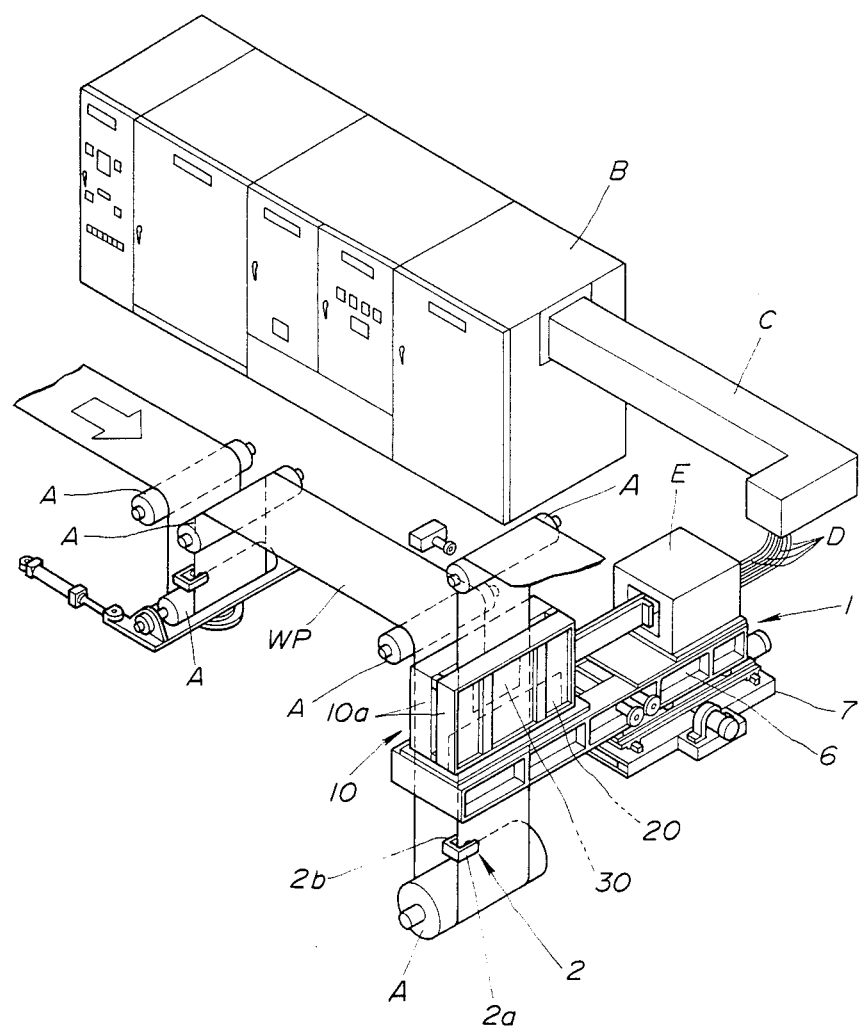
FIG. 1 is a perspective view showing one embodiment of an indution heating apparatus made in accordance with the invention.

With reference to the drawings, wherein like numerals refer to like parts in the several views, and in particular to FIG. 1, there is shown one embodiment of an induction heating apparatus made in accordance with the invention.

The induction heating apparatus includes a pair of heating coil units 10 carried on respective frames 10a disposed in spaced-parallel relation to each other so that a workpiece WP, which is transported by means of a plurality of feed rollers A, can pass between the heating coil units 10. Each of the heating coil units 10 includes a main heating coil 20 and an auxiliary heating coil 30 placed at a position adjacent to the main heating coil 20. A power source unit B is connected to a matching transformer E through flexible cables D covered by a protective duct C. The matching transformer E is connected to supply a high- or intermediate-frequency alternating current to the main and auxiliary heating coils 20 and 30 to produce rapidly alternating magnetic field crossing the workpiece, causing heating.

The induction heating apparatus is shown as including a control unit, generally designated by the numeral 1, for adjusting the coil frame 10a to a target position with respect to the workpiece WP in response to a position sensor 2. The position sensor 2 has a U-shaped sensor frame which carries light-emission and light-receipt elements 2a and 2b facing to each other for sensing the position of one side edge of the workpiece WP with respect to the coil frames 10a. Although the position sensor 2 is shown as positioned on the upstream side of the heating coil units 10, it will be appreciated that it may be positioned on the downstream side of the heating coil units 10. In addition, the position sensor 2 my be of another type which can sense the workpiece position in a mechanical or acoustic manner.

Figure 2A:
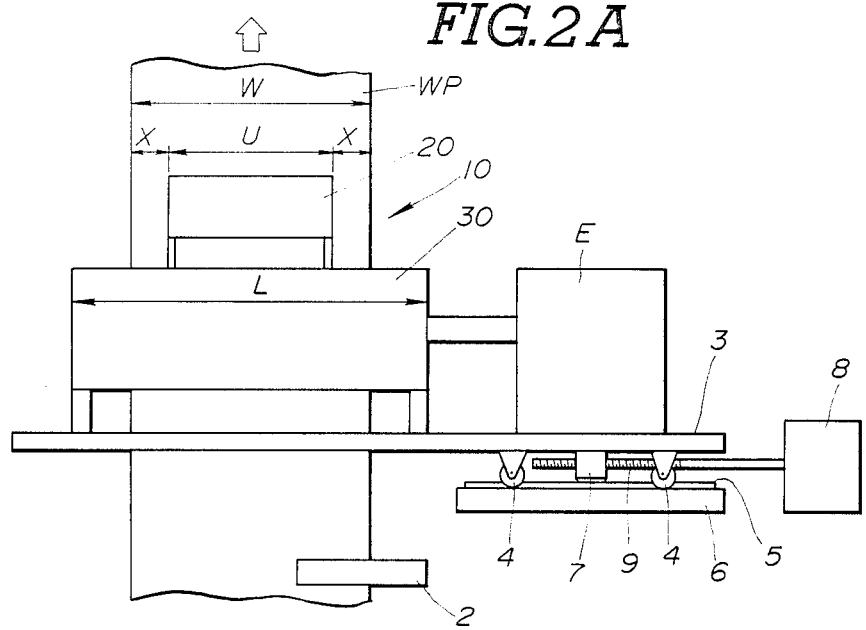
FIG. 2A is an enlarged elevational view showing heating coil unit shifting device used in the induction heating apparatus of FIG. 1.
Figure 2B:
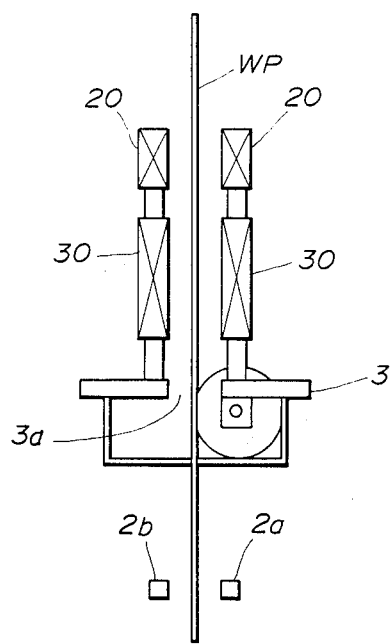
FIG. 2B is an enlarged side view showing the heating coil unit shifting device.

Referring to FIGS. 2A and 2B, the coil frames 10a are carried on a movable table 3 along with the matching transformer E. The movable table 3 has rollers 4 positioned on guide rails 5 provided on a platform 6 positioned on one side of the coil frames 10a so that the movable table 3 can move in a direction perpendicular to the direction of transportation of the workpiece WP. The movable table 3 has a piece 7 secured on its lower surface. The piece 7 is formed with a threaded through-hole extending in the direction of movement of the movable table. The numeral 8 designates a servo motor having an output shaft with a threaded portion 9 held in engagement with the threaded through-hole of the piece 7. The servo motor 8 is controlled by a servo control circuit (not shown) which receives the sensor signal from the position sensor 2, calculates an error between the sensed and target positions of the heating coil units, and drives the servo motor 8 so as to move the movable table 3 in a direction reducing the calculated error to zero. Such a servo control circuit is well known in the art and will not be described in detail. As best shown in FIG. 2B, the movable table 3 has a cutout 3a which is effective to avoid any direct contact of the movable table 3 with the workpiece WP.

Figure 3:
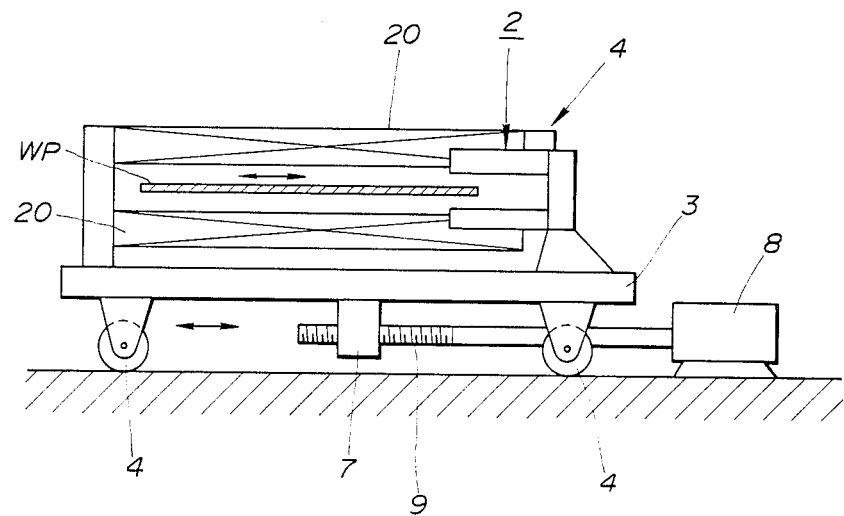
FIG. 3 is a side view showing a modified form of the heating coil unit shifting device.

Referring to FIG. 3, there is shown a modified form of the movable table which is substantially the same as the structure of FIGS. 2A and 2B except for its application to the case where the workpiece WP is transported between the heating coil units 10 in the horizontal direction. Accordingly, parts in FIG. 3 which are like those in FIGS. 2A and 2B have been given like reference numerals.

Figure 4:
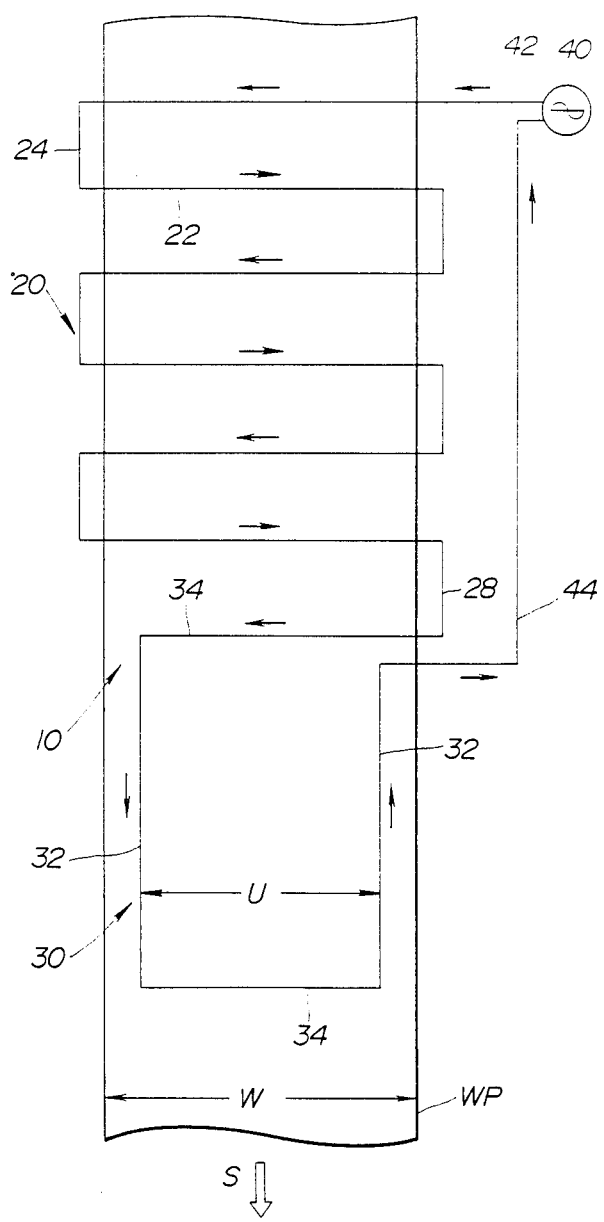
FIG. 4 is a schematic plan view showing one embodiment of the heating coil unit used in the induction heating apparatus of the invention.

Referring to FIG. 4, each of the heating coil units 10 includes a main heating coil 20 and an auxiliary heating coil 30 connected in series with each other. The main heating coil 20 includes a plurality of (in the illustrated case six) spaced-parallel transverse conductors 22 extending in a direction substantially perpendicular to the direction, indicated by the bold arrow S, of transportation of the workpiece WP. The transverse conductors 22 are shown as having a length L longer than the width W of the workpiece WP. The transverse conductors 22 are connected in series by means of electrical connections 24 so that the directions of the AC current flow through adjacent two transverse conductors 22 are opposite, as shown in FIG. 4. Such an AC current flow produces rapidly alternating magnetic field to induce an electric potential in the workpiece WP, causing heating therein.

The auxiliary heating coil 30 includes a pair of spaced-parallel longitudinal conductors 32 extending substantially in the same direction as the direction of transportation of the workpiece WP. The longitudinal conductors 32 are spaced a distance U from each other, the distance U being shorter than the width W of the workpiece WP. One of the longitudinal conductors 32 is placed at a position facing to the workpiece WP at a slight distance inside from one of the side edges of the workpiece WP, while the other longitudinal conductor is placed at a position facing to the workpiece WP at a slight distance inside from the other side edge of the workpiece WP. The longitudinal conductors 32 are connected in series with each other by electrical connections 34 so that the directions of the AC current flow through the two longitudinal conductors 32 are opposite, as shown in FIG. 4. Such an AC current flow produces rapidly alternating magnetic field to induce an electric potential in the workpiece WP, causing heating therein.

Figure 5:
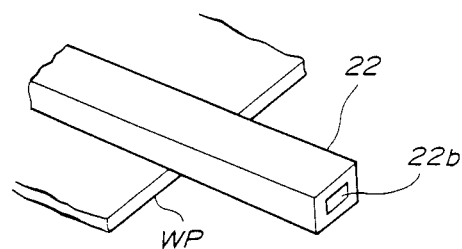
FIG. 5 is a fragmentary perspective view showing a water-cooled coil conductor used in the heating coil unit.

Referring to FIG. 5, each of the transverse conductors 22 is taken in the form of a water-cooled conductor having a coolant passage 22b extending axially thereof. Although the transverse conductor 22 is shown as having a rectangular cross section, it is to be noted that its cross section may have a circular or other suitable shape. The longitudinal conductors 32 and the electrical connections 24 and 24 may have the same structure as the transverse conductors 24. In this case, it is preferable to connect the coolant passages to form a series connected coolant conduit through which a coolant is circulated so as to dissipate the heat in the heating coils 20 and 30.

Figure 6A:
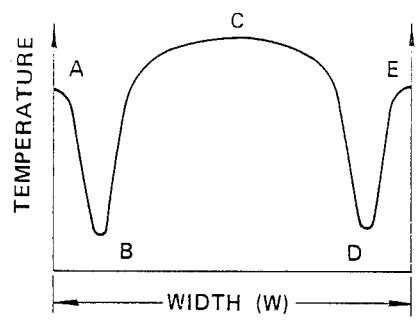
FIGS. 6A to 6C are graphs used in explaining the operation of the heating coil unit.
Figure 6B:
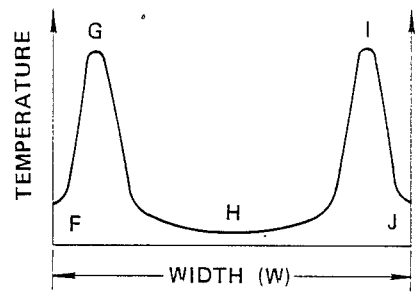

The main heating coils 20 arranged in pair have such a heating characteristic as shown in FIG. 6A which shows an illustration of the temperature distributed widthwise on the workpiece WP. It can be seen from a study of FIG. 6A that the temperature curve has two troughs at points B and D. These two trough points B and D appear at positions adjacent to or at a small distance inside from the respective opposite side edges of the workpiece WP. The auxiliary heating coils 30 arranged in pair have such a heating characteristic as shown in FIG. 6B which shows an illustration of the temperature distributed widthwise on the workpiece WP. As can be seen from FIG. 3B, the temperature curve has two crests at points G and I. These two crest points G and I appear at respective positions at which the longitudinal conductors face to the workpiece WP. The distance U between the longitudinal conductors 32 may be set in such a manner that the crest points G and I of FIG. 6B correspond to the respective trough points B and D of FIG. 6A to obtain a uniform temperature distribution over the full width W of the workpiece WP, as shown in FIG. 6C.

Figure 6C:
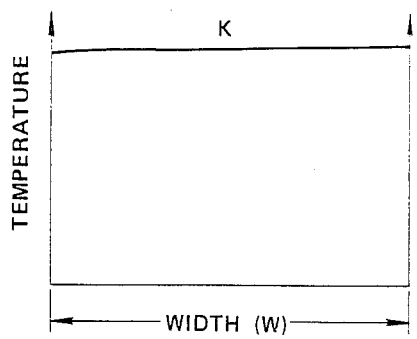

Assuming now that the workpiece WP is transported in the direction indicated by the bold arrow S of FIG. 4 at a predetermined speed, the workpiece WP passes the space between the main heating coils 20 where it is heated to have a temperature curve, as shown in FIG. 6A, and then it passes the space between the auxiliary heating coils 30 where heat is generated to compensate for the temperature ununiformity so as to provide a uniform temperature distribution over the full width of the workpiece WP, as shown in FIG. 6C.

Experiments were conducted for a metal sheet having a thickness of 0.5 mm and a width of 400 mm. In an experimental induction heating apparatus similar to the illustrated one, the metal sheet was heated at about 600° C. The difference between the highest and lowest temperatures distributed widthwise on the metal sheet was about 20° C. or less.

Figure 7A:
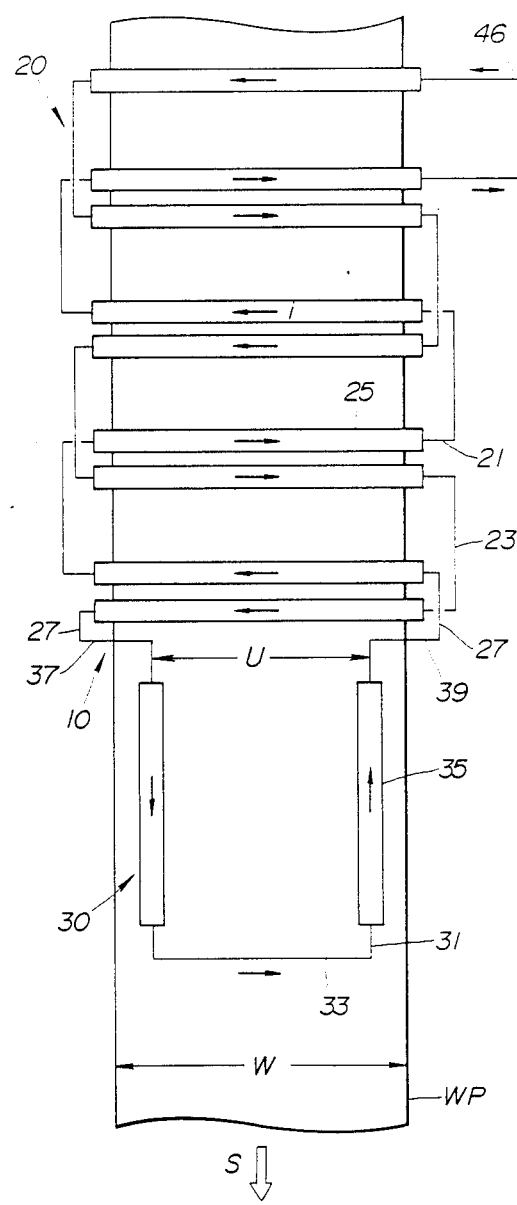
FIG. 7A is a schematic plan view showing a modified form of the heating coil unit of FIG. 4.
Figure 7B:
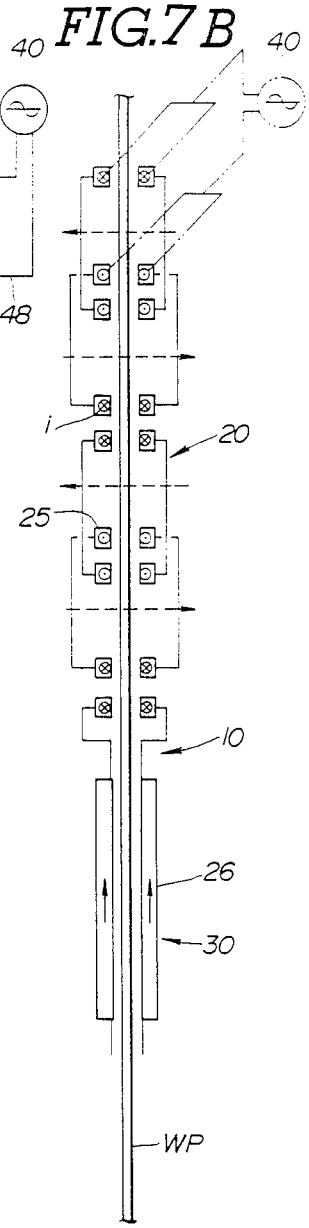
FIG. 7B is a schematic side view of the modification of FIG. 7A.

Referring to FIGS. 7A and 7B, there is illustrated a modified form of the induction heating apparatus. In this modification, each of the main heating coils 20 includes a plurality of (in the illustrated case eight) spaced-parallel transverse conductors 21 extending in a direction substantially perpendicular to the direction, indicated by the bold arrow S of FIG. 7A, of transportation of the workpiece WP. Except for the two outermost transverse conductors 21, the transverse conductors 21 are arranged to form a plurality of pairs each including two transverse conductors 21 placed in close promixity with each other. The transverse conductors 21 are shown as having a length L longer than the width W of the workpiece WP. Each of the transverse conductors 21 has a magnetic shield 25 mounted thereon. The magnetic shield 25 extends almost the full length of the transverse conductor 21 and has a U-shaped cross section to cover the transverse conductor 21 except for its one side facing to the workpiece WP in order to minimize the magnetic flux leakage and increase the magnetic flux concentration so as to improve the heating efficiency. The numeral 23 designates electrical connections connected to establish a series connection of the transverse conductors 21 so that the directions of the AC current flow through adjacent two transverse conductors 21 placed in pair are the same, as shown in FIG. 7A. Such an AC current flow produces rapidly alternating magnetic field $\phi$, as shown in FIG. 7B, to induce an electric potential in the workpiece WP, causing heating therein.

Each of the auxiliary heating coils 30 includes a pair of spaced-parallel longitudinal conductors 31 extending substantially in the same direction as the direction of transportation of the workpiece WP. The longitudinal conductors 31 are spaced a distance U from each other, the distance U being shorter than the width W of the workpiece WP. One of the longitudinal conductors 31 is placed at a position facing to the workpiece WP at a small distance inside from one of the side edges of the workpiece WP, while the other longitudinal conductor is placed at a position facing to the workpiece WP at a small distance inside from the other side edge of the workpiece WP. Each of the longitudinal conductors 31 has a magnetic shield 35 mounted thereon. The magnetic shield 35 extends almost the ful length of the longitudinal conductor 31 and has a U-shaped cross section to cover the longitudinal conductor 31 except for its one side facing to the workpiece WP in order to minimize the magnetic flux leakage and increase the magnetic flux concentration so as to improve the heating efficiency. The longitudinal conductors 31 are connected in series with each other by an electrical connection 25 and is connected to the transverse conductors 21 through electrical connections 37 and 39 so that the directions of the AC current flow through the two longitudinal conductor 31 are opposite, as shown in FIG. 7A. Such an AC current flow produces rapidly alternating magnetic field to induce an electric potential in the workpiece WP, causing heating therein.

Figure 8:
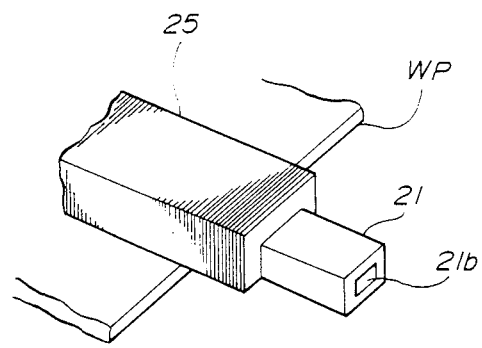
FIG. 8 is a fragmentary perspective view showing a water-cooled coil conductor with a magnetic shield used in the heating coil unit.

Referring to FIG. 8, each of the transverse conductors 21 is taken in the form of a water-cooled conductor having a coolant passage 21b extending axially thereof. Although the transverse conductor 21 is shown as having a rectangular cross section, it is to be noted that its cross section may have a curcular or other suitable shape. In addition, the magnetic shield 25, which has a U-shaped cross section, covers the corresponding transverse conductor 21 except for its one side facing to the workpiece WP in order to minimize the magnetic flux leakage and increase the magnetic flux concentration so as to improve the heating efficiency. The longitudinal conductors 31 may have the same structure as the transverse conductors 21. The electrical connections 23 and 33 may have the same structure as described in connection with FIG. 5.

Figure 9:
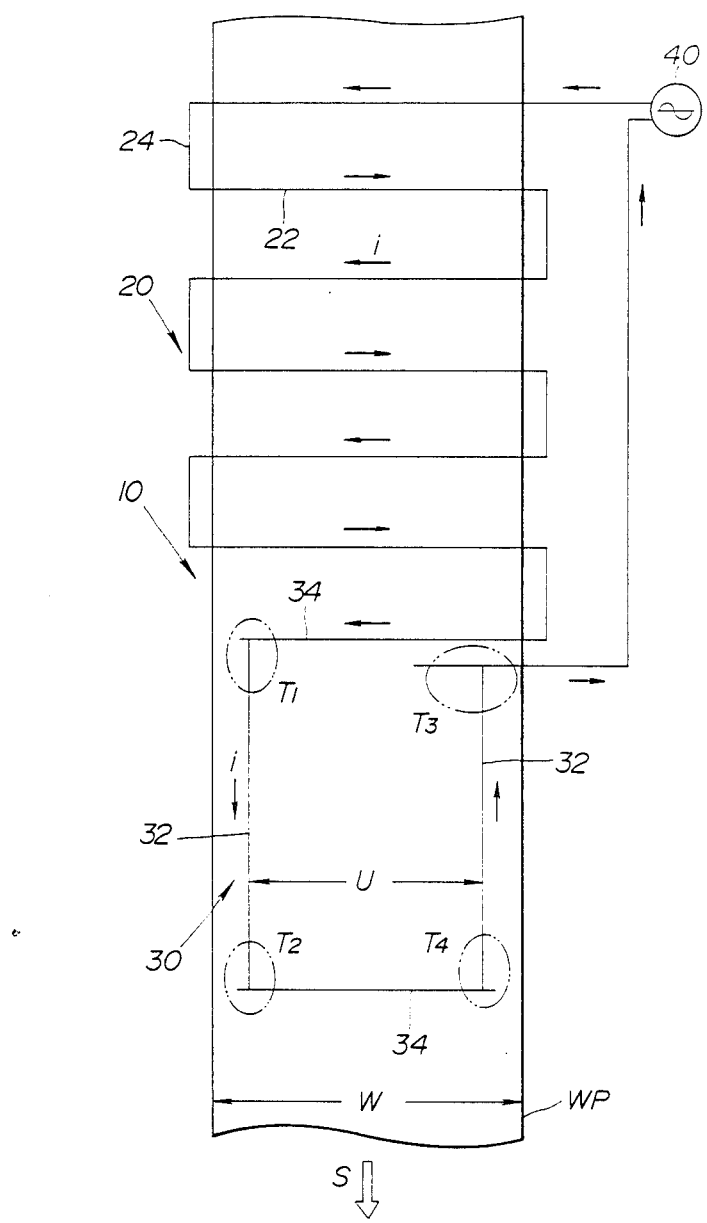
FIG. 9 is a schematic plan view showing another modified form of the heating coil unit of FIG. 4.

Referring to FIG. 9, there is illustrated another modified form of the induction heating apparatus which is substantially the same as described in connection with FIG. 4 except that coupling mechanisms are provided for use in adjusting the distance U between the longitudinal conductors. Accordingly, parts in FIG. 9 which are like those in FIG. 4 have been given like reference numerals. In this modification, a pair of coupling mechanisms T1 and T2 is provided to make mechanical and electrical couplings of one of the longitudinal conductors 32 between the electrical connections 34. The coupling mechanism pair permits movement of the one longitudinal conductor 32 with respect to the other longitudinal conductor along the electrical connections 34 in order to vary the distance U between the longitudinal conductors 32 so as to adjust the crest points G and I (FIG. 6B) to positions corresponding to the respective trough points B and D (FIG. 6A).

Figure 10:
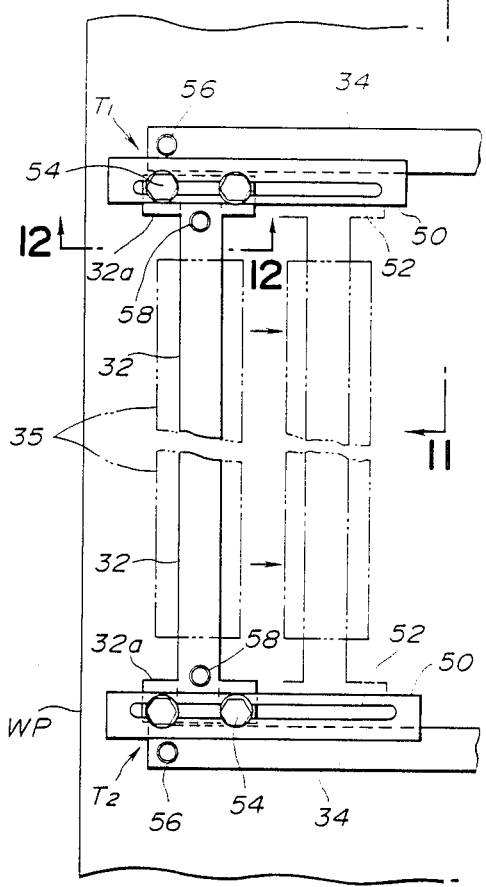
FIG. 10 is a fragmentary plan view showing coupling mechanisms which may be used in the heating coil unit.
Figure 11:
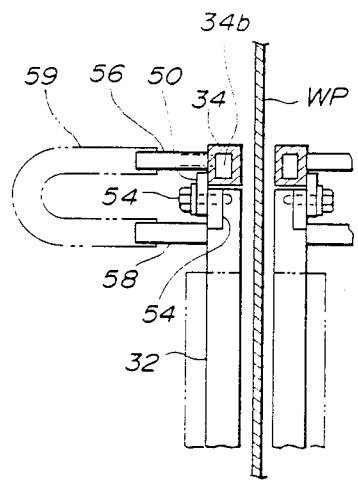
FIG. 11 is a sectional view taken along the lines 11—11 of FIG. 10.
Figure 12:
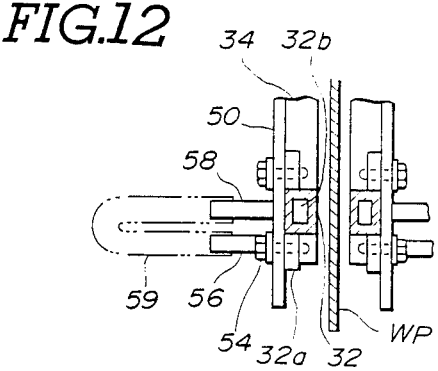
FIG. 12 is a sectional view taken along the lines 12—12 of FIG. 10.

Referring to FIGS. 10 to 12, the one longitudinal conductor 32 is provided at the opposite ends thereof with franges 32a each having two threaded holes. A mounting frange 50, which is secured on each of the electrical connections 34, is formed with an elongated slot 52 extending in parallel with the corresponding electrical connection 34. The frange 32a is secured on the corresponding mounting frange 50 by two bolts 54 which are threaded in the respective threaded holes to secure the corresponding mounting frange 50 between their heads and the frange 32a. Each of the electrical connections 34 is formed near its opposite ends with ports 56 through which its coolant passage 34b opens to the exterior and each of the longitudinal conductors 32 is formed near its opposite ends with ports 58 through which its coolant passage 32b opens to the exterior. Four coolant hoses 59 are provided to make hydraulic connections between ports 56 and 58 so as to form a series connected coolant conduit in each of the auxiliary heating coils 30. To move the one longitudinal conductor 32 with respect to the other longitudinal conductor, the bolts 54 may be loosened to such an extent that the flanges 32 can slide along the respective mounting franges 50. After the one longitudinal conductor 32 moves to a desired position with respect to the other longitudinal conductor, the bolts 54 are tightened again to fix the one longitudinal conductor 32 to the electrical connections 34. Although two coupling mechanisms T1 and T2 are illustrated and described, it is to be appreciated that four similar coupling mechanisms T1 to T4 may be provided, as indicated by the two-dotted lines of FIG. 9, to permit movement of both of the longitudinal conductors 32.

Figure 13:
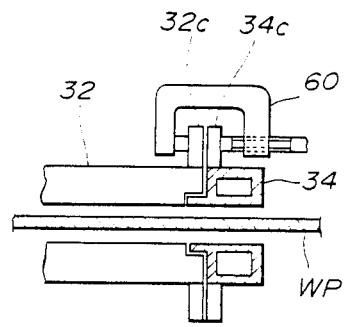
FIG. 13 is a sectional view showing a modified form of the coupling mechanism of FIG. 10.

Referring to FIG. 13, there is illustrated a modified form of the coupling mechanism where the longitudinal conductor 32 has a frange 32c which mates with a frange 34c projecting from the electrical connection 34. A clamping device 60 is used to clamp the flanges 32c and 34c together.

Figure 14:
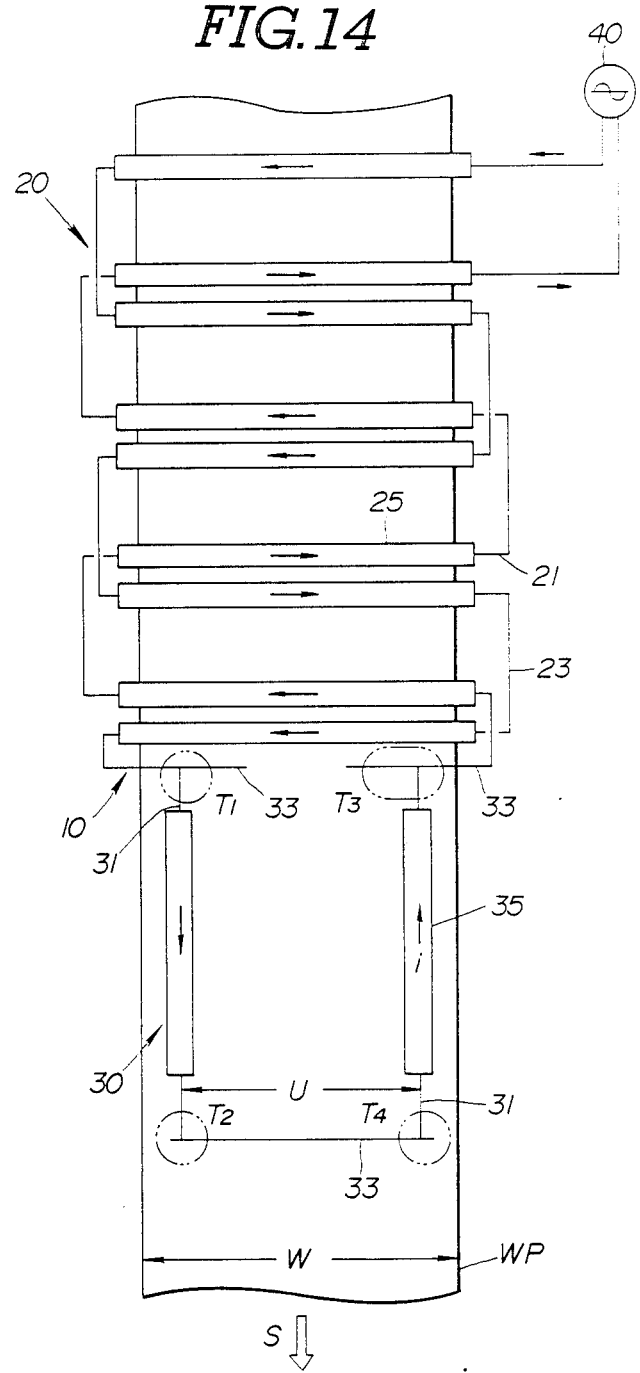
FIG. 14 is a schematic plan view showing still another modification of the heating coil unit of FIG. 4.

Referring to FIG. 14, there is illustrated still another modified form of the induction heating apparatus which is substantially the same as described in connection with FIG. 7A except that coupling mechanisms are provided for use in adjusting the distance U between the longitudinal conductors. Accordingly, parts in FIG. 14 which are like those in FIG. 7A have been given like reference numerals. In this modification, four coupling mechanisms T1 to T4 are provided to make mechanical and electrical couplings of one of the longitudinal conductors 31 between the electrical connections 33. The coupling mechanisms permit movement both of the longitudinal conductors 31 with respect to the corresponding longitudinal conductors along the electrical connections 33 in order to vary the distance U between the longitudinal conductors 31 so as to adjust the crest points G and I (FIG. 6B) to positions corresponding to the respective trough points B and D (FIG. 6A). The coupling mechanisms T1 to T4 may be the same as described in connection with FIGS. 10 to 12 or FIG. 13. The magnetic shields 35 are indicated by the two-dotted lines of FIG. 10.

Figure 15:
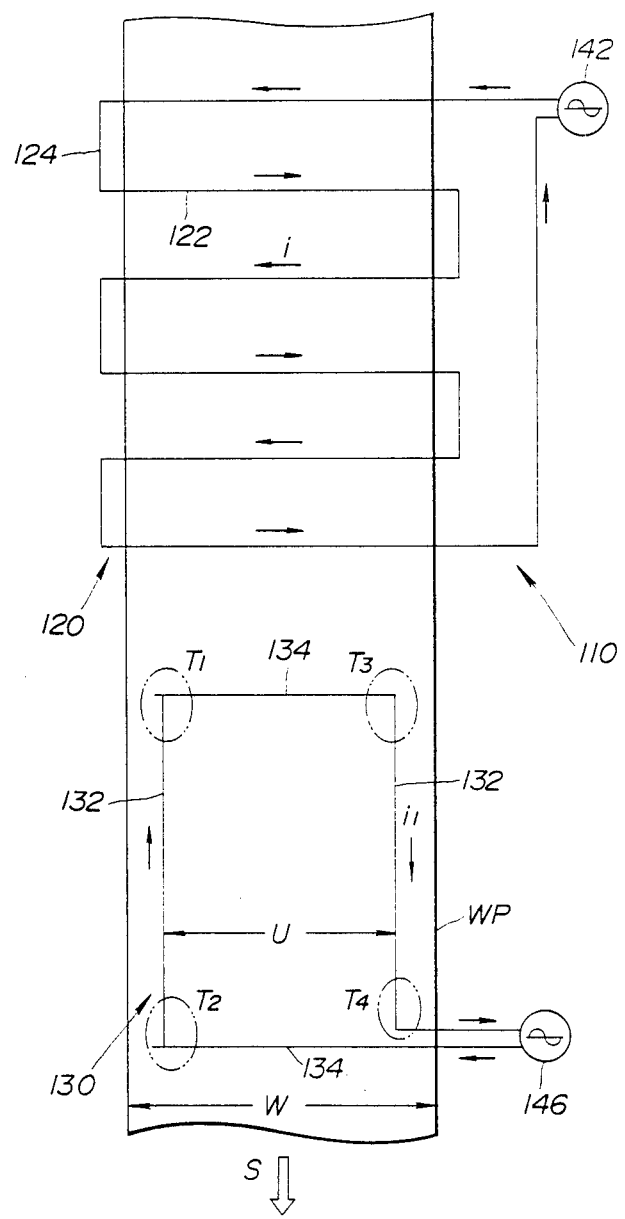
FIG. 15 is a schematic plan view showing a second embodiment of the heating coil unit of the invention.

Referring to FIG. 15, there is illustrated a second embodiment of the induction heating apparatus of the invention. The induction heating apparatus includes a pair of heating coil units, one of which is shown at 110 in FIG. 15, disposed in spaced-parallel relation to each other so that the workpiece WP can be transported between the heating coil units 110. Each of the heating coil units 110 includes a main heating coil 120 and an auxiliary heating coil 130 placed at a position adjacent to the main heating coil 120. A power source 142 is connected to supply a high- or intermediate-frequency alternating current to the main heating coils 120 to produce magnetic field crossing the workpiece WP. Another power source 146 is connected to supply a high- or intermediate-frequency alternating current to the auxiliary heating coils 130 to produce magnetic field crossing the workpiece WP.

The main heating coil 120 includes a plurality of (in the illustrated case six) spaced-parallel transverse conductors 122 extending in a direction substantially perpendicular to the direction, indicated by the bold arrow S, of transportation of the workpiece WP. The transverse conductors 122 are shown as having a length L longer than the width W of the workpiece WP. The transverse conductors 122 are connected in series by means of electrical connections 124 so that the directions of the AC current flow through adjacent two transverse conductors 122 are opposite, as shown in FIG. 15. Such an AC current flow produces rapidly alternating magnetic field to induce an electric potential in the workpiece WP, causing heating therein.

The auxiliary heating coil 130 includes a pair of spaced-parallel longitudinal conductors 132 extending substantially in the same direction as the direction of transportation of the workpiece WP. The longitudinal conductors 132 are spaced a distance U from each other, the distance U being shorter than the width W of the workpiece WP. One of the longitudinal conductors 132 is placed at a position facing to the workpiece WP at a small distance inside from one of the side edges of the workpiece WP, while the other longitudinal conductor is placed at a position facing to the workpiece WP at a small distance inside from the other side edge of the workpiece WP. The longitudinal conductors 132 are connected in series with each other by electrical connections 134 so that the directions of the AC current flow through the two longitudinal conductors 132 are opposite, as shown in FIG. 15. Such an AC current flow produces rapidly alternating magnetic field to induce an electric potential in the workpiece WP, causing heating therein.

Figure 16:
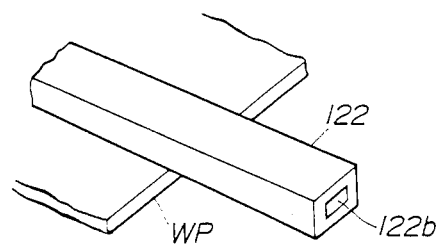
FIG. 16 is a fragmentary perspective view showing a water-cooled coil conductor used in the heating coil unit.

Referring to FIG. 16, each of the transverse conductors 122 is taken in the form of a water-cooled conductor having a coolant passage 122b extending axially thereof. Although the transverse conductor 122 is shown as having a rectangular cross section, it is to be noted that its cross section may have a circular or other suitable shape. The electrical connections 124 may have the same structure as the transverse conductors 124. In this case, it is preferable to connect the coolant passages to form a series connected coolant conduit through which a coolant is circulated so as to dissipate the heat in the main heating coils 120. The longitudinal conductors 132 and the electrical connections 134 may have the same structure as the transverse conductors 124. In this case, it is preferable to connect the coolant passages to form a series connected coolant conduit through which a coolant is circulated so as to dissipate the heat in the auxiliary heating coils 130.

Figure 17A:
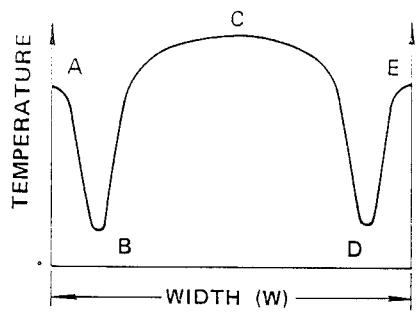
FIGS. 17A to 17C are graphs used in explaining the operation of the heating coil unit.

A pair of coupling mechanisms T1 and T2 is provided to make mechanical and electrical couplings of one of the longitudinal conductors 132 between the electrical connections 134. The coupling mechanism pair permits movement of the one longitudinal conductor 132 with respect to the other longitudinal conductor along the electrical connections 134 in order to vary the distance U between the longitudinal conductors 132 so as to adjust the crest points G and I (FIG. 17B) to positions corresponding to the respective trough points B and D (FIG. 17A). The coupling mechanisms T1 and T2 may be the same in structure as described in connection with FIGS. 10 to 12 or FIG. 13. Although two coupling mechanisms have been described, it is to be noted that four similar coupling mechanisms T1 to T4 may be provided, as indicated by the two-dotted lines of FIG. 15, to permit movement of both of the longitudinal conductors 132.

Figure 17B:
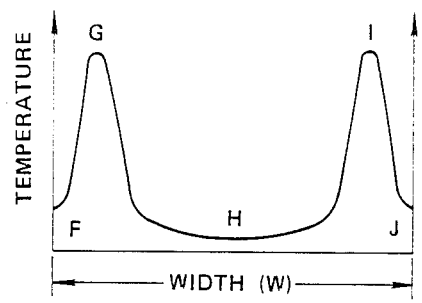

The main heating coils 120 arranged in pair have such a heating characteristic as shown in FIG. 17A which shows an illustration of the temperature distributed widthwise on the workpiece WP. It can be seen from a study of FIG. 17A that the temperature curve has two troughs at points B and D. These two trough points B and D appear at positions adjacent to or somewhat inner from the respective opposite side edges of the workpiece WP. The auxiliary heating coils 130 arranged in pair have such a heating characteristic as shown in FIG. 17B which shows an illustration of the temperature distributed widthwise on the workpiece WP. As can be seen from FIG. 17B, the temperature curve has two crests at points G and I. These two crest points G and I appear at respective positions at which the longitudinal conductors face to the workpiece WP. The distance U between the longitudinal conductors 132 may be adjusted in such a manner that the crest points G and I of FIG. 17B correspond to the respective trough points B and D of FIG. 17A to obtain a uniform temperature distribution over the full width W of the workpiece WP, as shown in FIG. 17C.

Figure 17C:
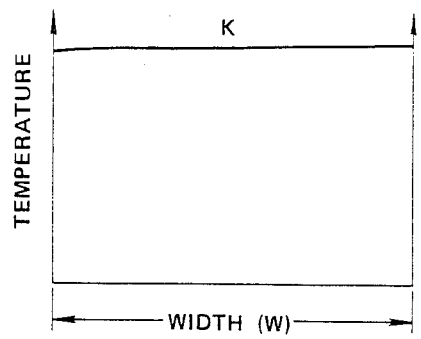

Assuming now that the workpiece WP is transported in the direction indicated by the bold arrow S of FIG. 15 at a predetermined speed, the workpiece WP passes the space between the main heating coils 120 where it is heated to have a temperature curve, as shown in FIG. 17A, and then it passes the space between the auxiliary heating coils 130 where heat is generated to compensate for the temperature ununiformity so as to provide a uniform temperature distribution over the full width of the workpiece WP, as shown in FIG. 17C.

Experiments were conducted for a metal sheet having a thickness of 0.5 mm and a width of 400 mm. In an experimental induction heating apparatus similar to the illustrated one, the metal sheet was heated at about 600° C. The difference between the highest and lowest temperatures distributed widthwise on the metal sheet was about 20° C. or less. In an experimental induction heating apparatus similar to the conventional one described herein previously, the difference between the highest and lowest temperatures distributed widthwise on the metal sheet was about 150° C.

In this embodiment, the main and auxiliary heating coils 120 and 130 are separated and supplied independently with a high- or intermediate-frequency alternating current from the respective power sources 142 and 146. This arrangement is effective to adjust the alternating current to the auxiliary heating coils 130 independently of the alternating current to the main heating coils 120.

Figure 18A:
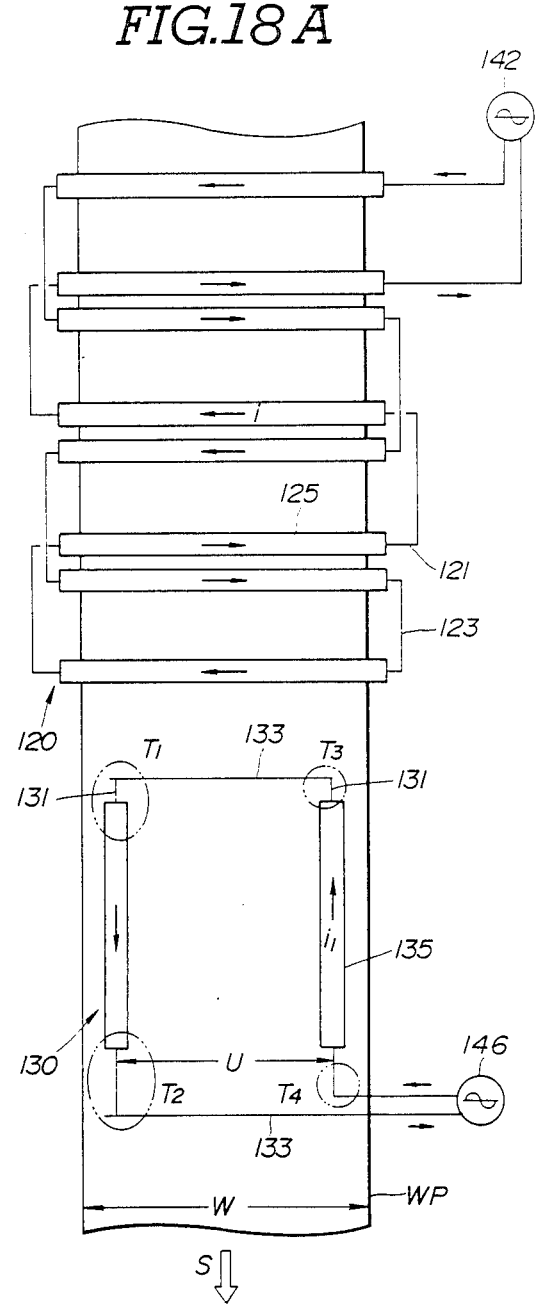
FIG. 18A is a schematic plan view showing a modified form of the heating coil unit of FIG. 15.
Figure 18B:
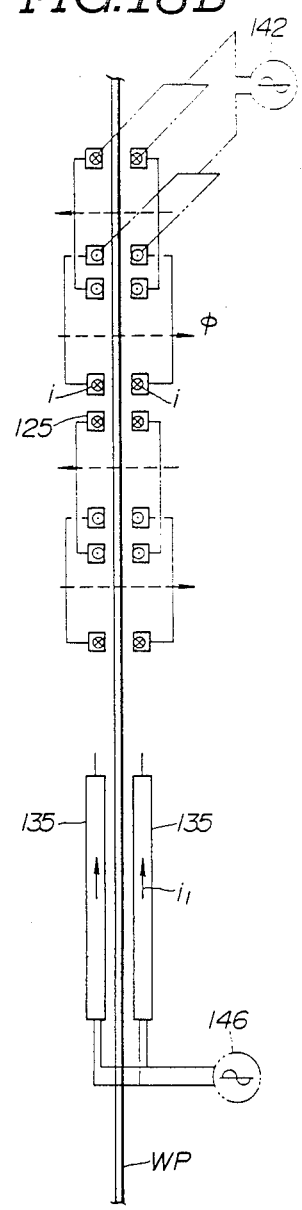
FIG. 18B is a schematic side view of the modification of FIG. 18A.

Referring to FIGS. 18A and 18B, there is illustrated a modified form of the induction heating apparatus. In this modification, each of the main heating coils 120 includes a plurality of (in the illustrated case eight) spaced-parallel transverse conductors 121 extending in a direction substantially perpendicular to the direction, indicated by the bold arrow S of FIG. 18A, of transportation of the workpiece WP. Except for the two outermost transverse conductors 121, the transverse conductors 121 are arranged to form a plurality of pairs each including two transverse conductors 121 placed in close proximity with each other. The transverse conductors 121 are shown as having a length L longer than the width W of the workpiece WP. Each of the transverse conductors 121 has a magnetic shield 125 mounted thereon. The magnetic shield 125 extends almost the full length of the transverse conductor 121 and has a U- shaped cross section to cover the transverse conductor 121 except for its one side facing to the workpiece WP in order to minimize the magnetic flux leakage and increase the magnetic flux concentration so as to improve the heating efficiency. The numeral 123 designates electrical connections connected to establish a series connection of the transverse conductors 121 so that the directions of the AC current flow through adjacent two transverse conductors 121 placed in pair are the same, as shown in FIG. 18A. Such an AC current flow produces rapidly alternating magnetic field $\phi$, as shown in FIG. 18B, to induce an electric potential in the workpiece WP, causing heating therein.

Each of the auxiliary heating coils 130 includes a pair of spaced-parallel longitudinal conductors 131 extending substantially in the same direction as the direction of transportation of the workpiece WP. The longitudinal conductors 131 are spaced a distance U from each other, the distance U being shorter than the width W of the workpiece WP. One of the longitudinal conductors 131 is placed at a position facing to the workpiece WP at a small distance inside from one of the side edges of the workpiece WP, while the other longitudinal conductor is placed at a position facing to the workpiece at a small distance inside from the other side edge of the workpiece WP. Each of the longitudinal conductors 131 has a magnetic shield 135 mounted thereon. The magnetic shield 135 extends almost the full length of the longitudinal conductor 131 and has a U-shaped cross section to cover the longitudinal conductor 131 except for its one side facing to the workpiece WP in order to minimize the magnetic flux leakage and increase the magnetic flux concentration so as to improve the heating efficiency. The longitudinal conductors 131 are connected in series with each other by electrical connections 125 so that the directions of the AC current flow through the two longitudinal conductor 31 are opposite, as shown in FIG. 15A. Such an AC current flow produces rapidly alternating magnetic field to induce an electric potential in the workpiece WP, causing heating therein.

Figure 19:
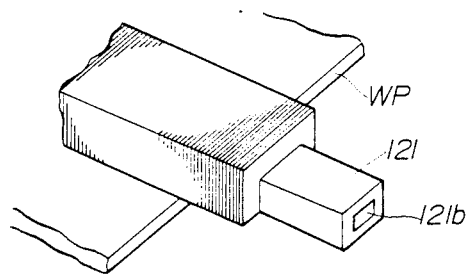
FIG. 19 is a fragmentary perspective view showing a water-cooled coil conductor with a magnetic shield used in the heating coil unit.

Referring to FIG. 19, each of the transverse conductors 121 is taken in the form of a water-cooled conductor having a coolant passage 121b extending axially thereof. Although the transverse conductor 121 is shown as having a rectangular cross section, it is to be noted that its cross section may have a circular or other suitable shape. In addition, the magnetic shield 125, which has a U-shaped cross section, covers the corresponding transverse conductor 121 except for its one side facing to the workpiece WP in order to minimize the magnetic flux leakage and increase the magnetic flux concentration so as to improve the heating efficiency. The longitudinal conductors 131 may have the same structure as the transverse conductors 121. The electrical connections 123 and 133 may have the same structure as described in connection with FIG. 16.

Figure 20A:
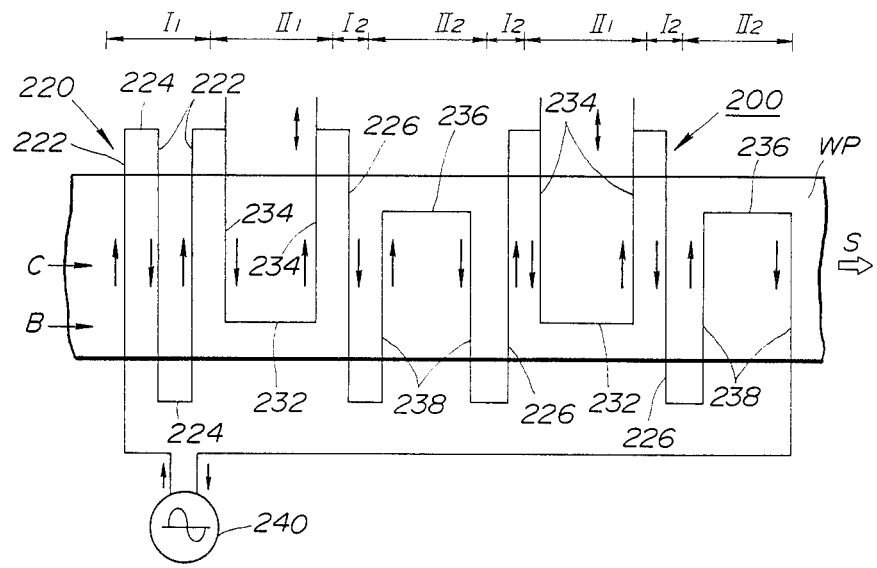
FIG. 20A is a schematic plan view showing a third embodiment of the heating coil unit of the invention.
Figure 20B:
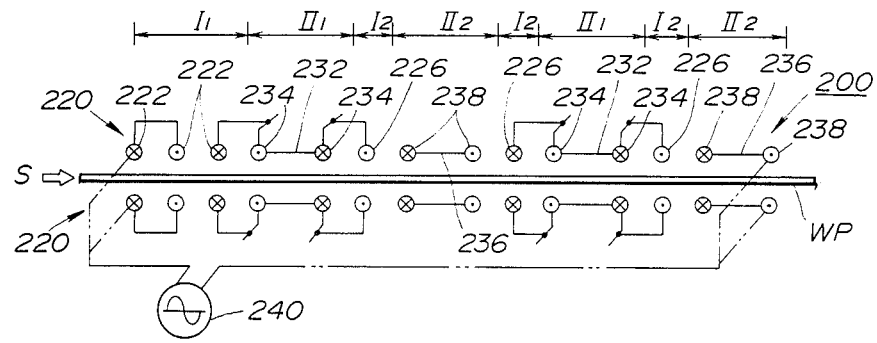
FIG. 20B is a schematic side view of the third embodiment of FIG. 20A.

Referring to FIGS. 20A and 20B, there is illustrated a third embodiment of the induction heating apparatus of the invention. The induction heating apparatus includes a pair of heating coil units 200 disposed in spaced-parallel relation to each other so that the workpiece WP can be transported between the heating coil units 200. Each of the heating coil units 200 includes a main heating coil 220 and an auxiliary heating coil 230 connected in series with the main heating coil 220. A power source 240 is connected to supply a high- or intermediate-frequency alternating current to the heating coil units 200 to produce rapidly alternating magnetic field crossing the workpiece WP.

The main heating coil 220 is divided into a first portion $I_1$ and a plurality of (in the illustrated case three) second portions $I_2$. The main heating coil first portion $I_1$ includes a plurality of (in the illustrated case three) spaced-parallel transverse conductors 222 extending in a direction substantially perpendicular to the direction of transportation of the workpiece WP. The transverse conductors 222 are connected in series by means of electrical connections 224 so that the directions of the AC current flow through adjacent two transverse conductors 222 are opposite, as shown in FIGS. 20A and 20B. Each of the main heating coil second portions $I_2$ has a transverse conductor 226 extending in a direction substantially perpendicular to the direction of transportation of the workpiece WP. The transverse conductors 222 and 226 have a length L longer than the width W of the workpiece WP.

The auxiliary heating coil 230 is divided into a plurality of (in the illustrated case two) first portions $II_1$ and a plurality of (in the illustrated case two) second portions $II_2$. Each of the auxiliary heating coil first portions $II_1$ has a longitudinal conductor 232 extending substantially in the same direction as the direction of transportation of the workpiece WP, the longitudinal conductor 232 being placed at a position facing to the workpiece WP at a small distance inside from one of the side edges of the workpiece WP, and a pair of transverse conductors 234 connected respectively to the opposite ends of the longitudinal conductor 232. Each of the auxiliary heating coil second portions $II_2$ has a longitudinal conductor 236 extending in the same direction as the direction of transportation of the workpiece WP, the longitudinal conductor 236 being placed at a position facing to the workpiece WP at a small distance inside from the other side edge of the workpiece WP, and a pair of transverse conductors 238 connected respectively to the opposite ends of the longitudinal conductor 236.

The main heating coil first portion $I_1$ is connected in series with one of the auxiliary heating coil first portions $II_1$, which in turn is connected in series with one of the main heating coil second portions $I_2$, which in turn is connected in series with one of the auxiliary heating coil second portions $II_2$. This auxiliary heating coil second portion $I_2$ is connected in series with another main heating coil second portion $I_2$, which in turn is connected in series with the other auxiliary heating coil first portion $II_1$. This auxiliary heating coil first portion $II_1$ is connected in series with the other main auxiliary heating coil second portion $I_2$, which in turn is connected in series with the other main heating coil second portion $I_2$, which in turn is connected in series with the other auxiliary heating coil second portion $II_2$.

Assuming now that the workpiece WP is transported in the direction indicated by the bold arrow S of FIG. 20A, the workpiece WP passes the space between the main heating coil first portions $I_1$ where it is heated to have a temperature curve having two low-temperature or trough points B and D, as sown in FIG. 6A, the space between the auxiliary heating coil first portions $II_1$ where it is heated to have a high-temperature or crest point G (see FIG. 6B), the space between the main heating coil second portion $I_2$ where it is heated to have a temperature curve having two low-temperature or trough points B and D, as shown in FIG. 6A, and the space between the auxiliary heating coil second portion $II_2$ where it is heated to have a high-temperature or crest point I (FIG. 6B) in this sequence. During this operation, the workpiece WP is heated to have uniform temperature distribution over the full width of the workpiece WP, as shown in FIG. 6C. A similar operation is repeated while the workpiece WP passes the space between the main heating coil second portions $I_2$, the space between the auxiliary heating coil first portions $II_1$, the space between the main heating coil second portions $I_2$, and the space between the auxiliary heating coil second portions $II_2$ in this sequence.

Figure 21:
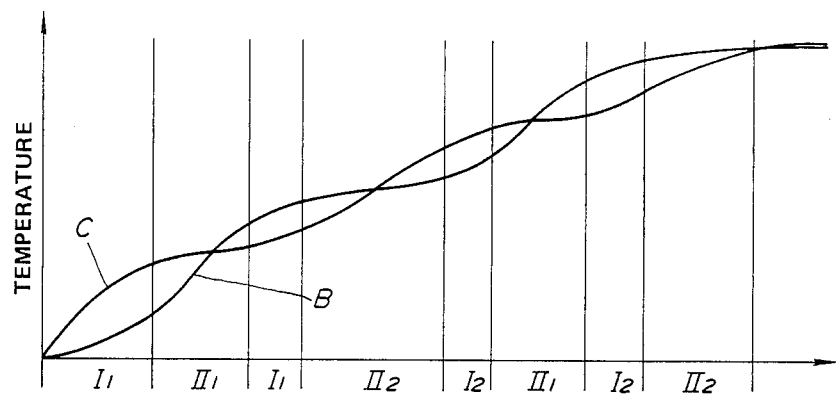
FIG. 21 is a graph used in explaining the operation of the third embodiment of the heating coil unit.

FIG. 21 shows variations in the temperature on the center point C (see FIG. 6A) of the workpiece WP and the temperature on point B or D (see FIG. 6A) while the workpiece WP passes the respective spaces. As can be seen from FIG. 21, the difference between the temperatures on the points C and B is relatively small. This stems from the fact that the main and auxiliary heating coil portions are disposed alternatively in the direction of transportation of the workpiece WP. Accordingly, there is substantially no stains which may occur to curve the workpiece WP during the heating operation. Therefore, the workpiece WP can be maintained at a constant clearance with respect to the heating coil units, which improves the temperature uniformity over the full width and full length of the workpiece WP. In addition, it is possible to increase the heating efficiency by reducing the clearance between the heating coil units through which the workpiece is transported.

Figure 22A:
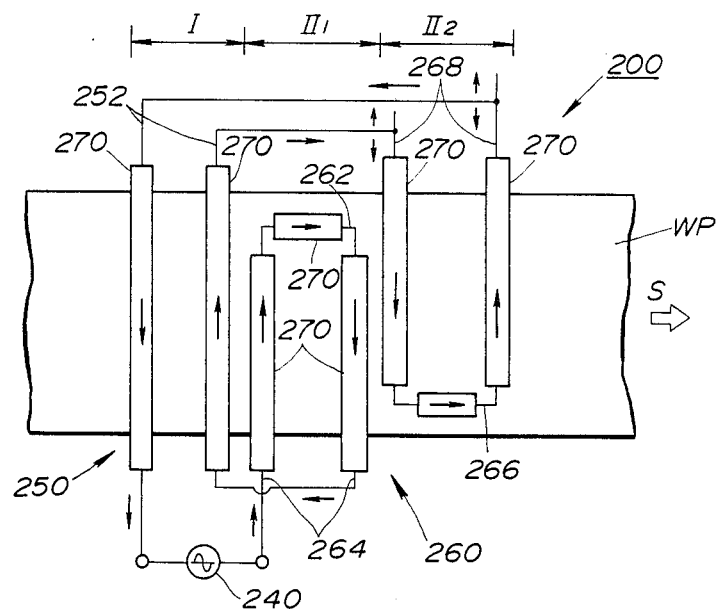
FIG. 22A is a schematic plan view showing a modified form of the heating coil unit of FIG. 20A.
Figure 22B:
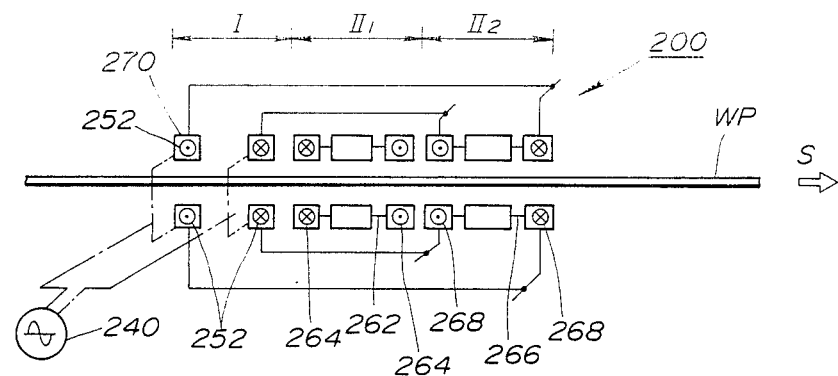
FIG. 22B is a schematic side view of the modification of FIG. 22A.

Referring to FIGS. 22A and 22B, there is illustrated a modified form of the induction heating apparatus. In this modification, the main heating coil 250 includes a plurality of (in the illustrated case two) spaced-parallel transverse conductors 252 extending in a direction substantially perpendicular to the direction of the transportation of the workpiece WP. The transverse conductors 252 have a length L longer than the width W of the workpiece WP. The auxiliary heating coil 260 is divided into a first portion $II_1$ and a second portion $II_2$. The auxiliary heating coil first portion $II_1$ has a longitudinal conductor 262 extending in the same direction as the direction of transportation of the workpiece WP, the longitudinal conductor 262 being placed at a position facing to the workpiece WP at a small distance inside from one of the side edges of the workpiece WP, and a pair of transverse conductors 264 connected respectively to the opposite ends of the longitudinal conductor 262. The auxiliary heating coil second portion $II_2$ has a longitudinal conductor 266 extending in the same direction as the direction of transportation of the workpiece WP, the longitudinal conductor 266 being placed at a position facing to the workpiece WP at a small distance inside from the other side edge of the workpiece WP, and a pair of transverse conductors 268 connected respectively to the opposite ends of the longitudinal conductor 266.

The main and auxiliary heating coils 250 and 260 are connected in series so that the directions of the AC current flow through the adjacent two transverse conductors 252 and 264 are the same and the directions of the AC current flow through the adjacent two transverse conductors 264 and 268 are the same, as shown in FIG. 22A. This connection is effective to increase the magnetic flux density. In addition, a magnetic shield 270 is provided to cover each of the transverse and longitudinal conductors except for its one side facing to the workpiece WP in order to minimize the magnetic flux leakage and increase the magnetic flux concentration so as to improve the heating efficiency. Coupling mechanisms, which may be substantially the same as described in connection with FIGS. 10 to 12 or FIG. 13, are provided to permit movement of each of the longitudinal conductors 262 and 266 with respect to the corresponding side edge of the workpiece in order to adjust the crest points G and I (see FIG. 6B) in coincidence with the trough points B and D (see FIG. 6A).

Assuming now that the workpiece WP is transported in the direction indicated by the bold arrow S of FIG. 22A, the workpiece WP passes the space between the main heating coils 250 where it is heated to have a temperature curve having two low-temperature or trough points B and D, as shown in FIG. 6A, the space between the auxiliary heating coil first portions $II_1$ where it is heated to compensate for the trough point D, and the space between the auxiliary heating coil second portions $II_2$ where it is heated to compensate for the trough point B. During this operation, the workpiece WP is heated to have uniform temperature distribution over the full width of the workpiece WP, as shown in FIG. 6C.

Figure 23:
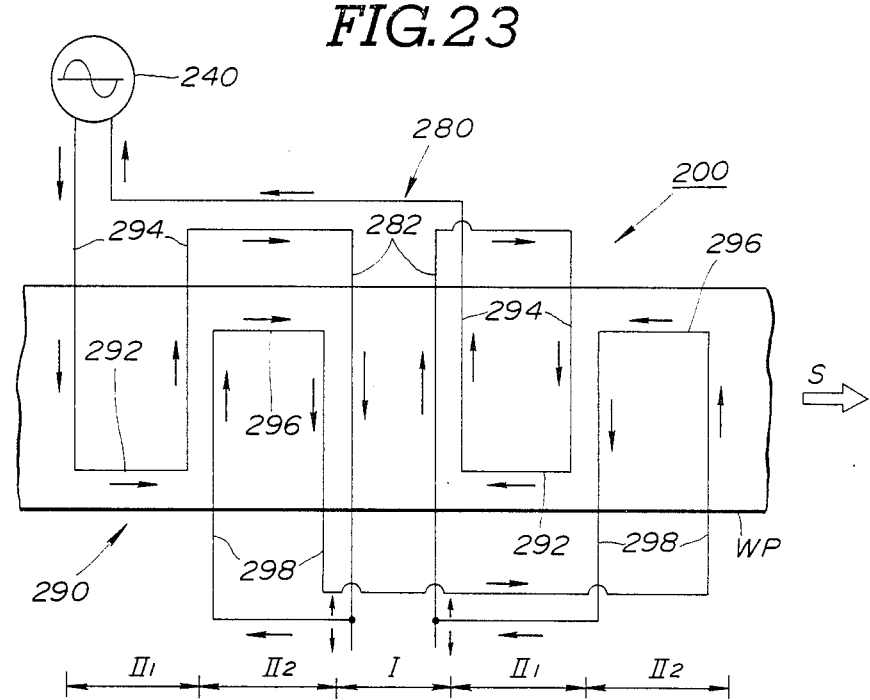
FIG. 23 is a schematic plan view showing another modified form of the heating coil unit of FIG. 20A.

Referring to FIG. 23, there is illustrated another modified form of the induction heating apparatus. In this modification, the main heating coil 280 includes a plurality of (in the illustrated case two) spaced-parallel transverse conductors 282 extending in a direction substantially perpendicular to the direction of the transportation of the workpiece WP. The transverse conductors 282 have a length L longer than the width W of the workpiece WP. The auxiliary heating coil 290 is divided into two first portions $II_1$ and two second portions $II_2$. Each of the auxiliary heating coil first portions $II_1$ has a longitudinal conductor 292 extending in the same direction as the direction of transportation of the workpiece WP, the longitudinal conductor 292 being placed at a position facing to the workpiece at a small distance inside from one of the side edges of the workpiece WP, and a pair of transverse conductors 294 connected respectively to the opposite ends of the longitudinal conductor 292. Each of the auxiliary heating coil second portions $II_2$ has a longitudinal conductor 296 extending in the same direction as the direction of transportation of the workpiece WP, the longitudinal conductor 296 being placed at a position facing to the workpiece at a small distance inside from the other side edge of the workpiece WP, and a pair of transverse conductors 298 connected respectively to the opposite ends of the longitudinal conductor 296.

The main and auxiliary heating coils 280 and 290 are connected in series so that the directions of the AC current flow through the adjacent two transverse conductors 298 and 294 are the same and the directions of the AC current flow through the adjacent two transverse conductors 282 and 294, 298 are the same, as shown in FIG. 23. This connection is effective to increase the magnetic flux density. Coupling mechanisms, which may be substantially the same as described in connection with FIGS. 10 to 12 or FIG. 13, are provided to permit movement of each of the longitudinal conductors 292 and 296 with respect to the corresponding side edge of the workpiece in order to adjust the crest points G and I (see FIG. 6B) in coincidence with the trough points B and D (see FIG. 6A).

Assuming now that the workpiece WP is transported in the direction indicated by the bold arrow S of FIG. 23, the workpiece WP passes the space between the auxiliary heating coil first portions $II_1$, the space between the auxiliary heating coil second portions $II_2$, the space between the main heating coils I, the space between the auxiliary heating coil first portions $II_1$, and the space between the auxiliary heating coil second portions $II_2$ in this order. During this operation, the workpiece WP is heated to have uniform temperature distribution over the full width of the workpiece WP, as shown in FIG. 6C.

Figure 24:
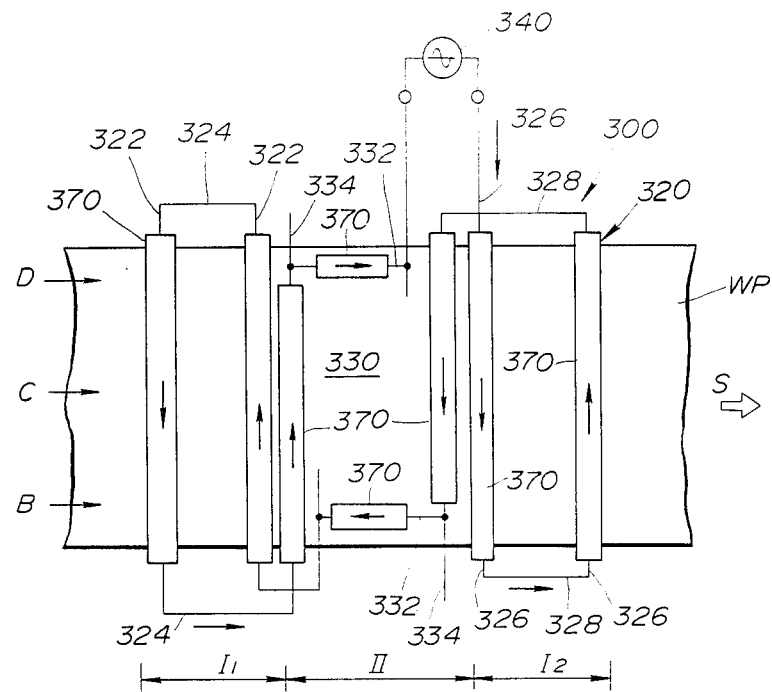
FIG. 24 is a schematic plan view showing a fourth embodiment of the heating coil unit of the invention.

Referring to FIG. 24, there is illustrated a fourth embodiment of the induction heating apparatus of the invention. The induction heating apparatus includes a pair of heating coil units 300 disposed in spaced-parallel relation to each other so that the workpiece WP can be transported between the heating coil units 300. Each of the heating coil units 300 includes a main heating coil 320 and an auxiliary heating coil 330 connected in series with the main heating coil 320. A power source 340 is connected to supply a high- or intermediate-frequency alternating current to the heating coil units 300 to produce rapidly alternating magnetic field crossing the workpiece WP.

The main heating coil 320 is divided into a first portion $I_1$ and a second portion $I_2$. The main heating coil first portion $I_1$ includes a plurality of (in the illustrated case two) spaced-parallel transverse conductors 322 extending in a direction substantially perpendicular to the direction of transportation of the workpiece WP. The transverse conductors 322 are connected in series by means of electrical connections 324 so that the directions of the AC current flow through adjacent two transverse conductors 322 are opposite, as shown in FIG. 24. The main heating coil second portion $I_2$ includes a plurality of (in the illustrated case two) spaced-parallel transverse conductors 326 extending in a direction substantially perpendicular to the direction of transportation of the workpiece WP. These transverse conductors 326 are connected in series by means of electrical connections 328 so that the directions of the AC current flow through the two transverse conductor 326 are opposite, as shown in FIG. 24. The transverse conductors 322 and 326 have a length L longer than the width W of the workpiece WP.

The auxiliary heating coil 330 is disposed between the main heating coil first and second portions $I_1$ and $I_2$ and it has a pair of spaced-parallel longitudinal conductors 332 extending substantially in the same direction as the direction of transportation of the workpiece WP, the longitudinal conductors 332 being placed at positions facing to the workpiece WP at a slight distance inside from the respective opposite side edges of the workpiece WP. The longitudinal conductors 332 are connected in series with each other by means of transverse conductors 334.

The main and auxiliary heating coils are connected in series so that the directions of the AC current flow through the adjacent two transverse conductors 322 and 334 are the same and the directions of the AC current flow through the adjacent two transverse conductors 326 and 334 are the same. This connection is effective to increase the magnetic flux density. In addition, a magnetic shield 370 is provided to cover each of the transverse and longitudinal conductors except for its one side facing to the workpiece WP in order to minimize the magnetic flux leakage and increase the magnetic flux concentration so as to improve the heating efficiency. Coupling mechanisms similar to those described in connection with FIGS. 10 to 12 or FIG. 13 may be provided to permit movement of each of the longitudinal conductors 332 with respect to the corresponding side edges of the workpiece in order to adjust the crest points G and I (see FIG. 6B) in coincidence with the trough points B and D (see FIG. 6A).

Figure 25:
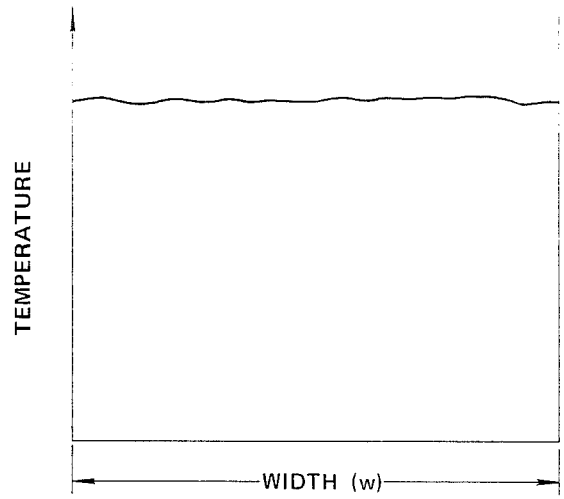

Assuming now that the workpiece WP is transported in the direction indicated by the bold arrow S of FIG. 24 at a constant speed, the workpiece WP passes the space between the main heating coil first portions $I_1$, the space between the auxiliary heating coils II, and the space between the main heating coil second portions $I_2$ in this sequence. During this operation, the workpiece WP is heated to have uniform temperature distribution over the full width of the workpiece WP, as shown in FIG. 25.

Figure 26:
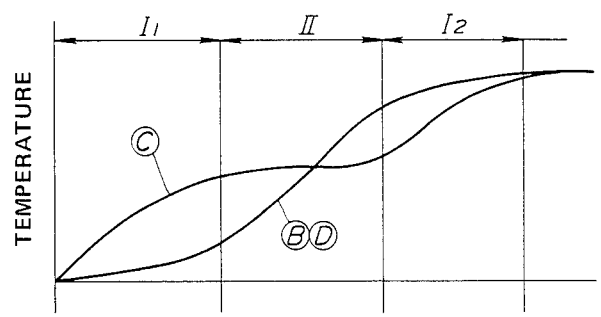
FIGS. 25 and 26 are graphs used in explaining the operation of the fourth embodiment of the heating coil unit.

FIG. 26 shows variations in the temperature on the center point C (see FIG. 6A) of the workpiece WP and the temperature on the point B or D (see FIG. 6A) while the workpiece WP passes the respective spaces. As can be seen from FIG. 6, the difference between the temperatures on the points C and B (or D) is relatively small. This stems from the fact that the main and auxiliary heating coil portions are disposed alternatively in the direction of transportation of the workpiece WP. Accordingly, there is substantially no stress which may occur to deform or curve the workpiece WP during the heating operation. Therefore, the workpiece WP can be maintained at a constant clearance with respect to the heating coil units, which improves the temperature uniformity over the full width and full length of the workpiece WP. In addition, it is possible to increase the heating efficiency by reducing the clearance between the heating coil units through which the workpiece is transported.

Figure 27A:
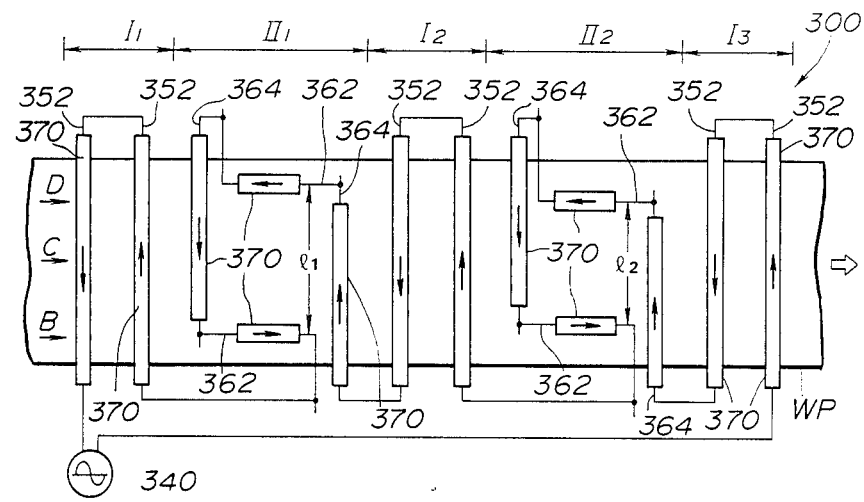
FIG. 27A is a schematic plan view showing a modified form of the heating coil unit of FIG. 24.
Figure 27B:
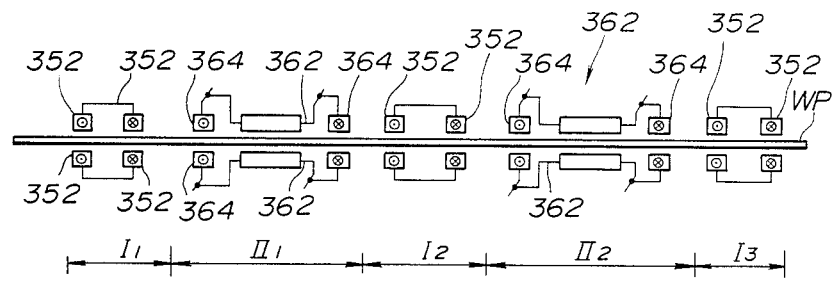
FIG. 27B is a schematic side view of the modification of FIG. 27A.

Referring to FIGS. 27A and 27B, there is illustrated a modified form of the induction heating apparatus. In this modification, the main heating coil is divided into three portions $I_1$, $I_2$ and $I_3$ each having two spaced-parallel transverse conductors 352 extending in a direction substantially perpendicular to the direction of the transportation of the workpiece WP. The transverse conductors 352 have a length L longer than the width W of the workpiece WP. The auxiliary heating coil is divided into two portion $II_1$ and $II_2$ each having a pair of spaced-parallel longitudinal conductor 362 extending substantially in the same direction as the direction of transportation of the workpiece WP, the longitudinal conductors being placed at respective positions facing to the workpiece WP at a small distance inside from the respective opposite side edges of the workpiece WP, and a pair of transverse conductors 364 connecting the longitudinal conductors 362 in series.

Figure 28:
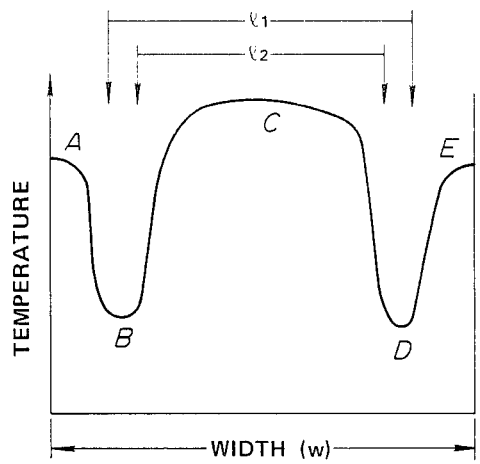
FIG. 28 and 29 are graphs used in explaining the operation of the modification of FIG. 27A.

The main and auxiliary heating coil portions are disposed alternatively and connected in series with each other. A magnetic shield 370 is provided to cover each of the transverse and longitudinal conductors except for its one side facing to the workpiece WP in order to minimize the magnetic flux leakage and increase the magnetic flux concentration so as to improve the heating efficiency. Coupling mechanisms, which may be substantially the same as described in connection with FIGS. 10 to 12 or FIG. 13, are provided to permit movement of both of the longitudinal conductors 362 widthwise of the workpiece in order to adjust the distance between the longitudinal conductors 362 of the auxiliary heating coil first portion $II_1$ at a value $l_1$ which is equal to the distance between a position somewhat outer from the trough B and a position somewhat outer from the trough D, as shown in FIG. 28, and the distance between the longitudinal conductors 366 of the auxiliary heating coil second portion II$_2$ at a value l$_2$ which is equal to the distance between a position somewhat inner from the trough B and a position somewhat inner from the trough D, as shown in FIG. 28.

Assuming now that the workpiece WP is transported in the direction indicated by the bold arrow S of FIG. 27A, the workpiece WP passes the space between the main heating coil first portions I$_1$, the space between the auxiliary heating coil first portions II$_1$, the space between the main heating coil second portion I$_2$, and the space between the auxiliary heating coil second portions II$_2$, and the space between the main heating coil third portions I$_3$. During this heating operation, the workpiece WP is heated to have uniform temperature distribution over the full width of the workpiece WP.

Figure 29:
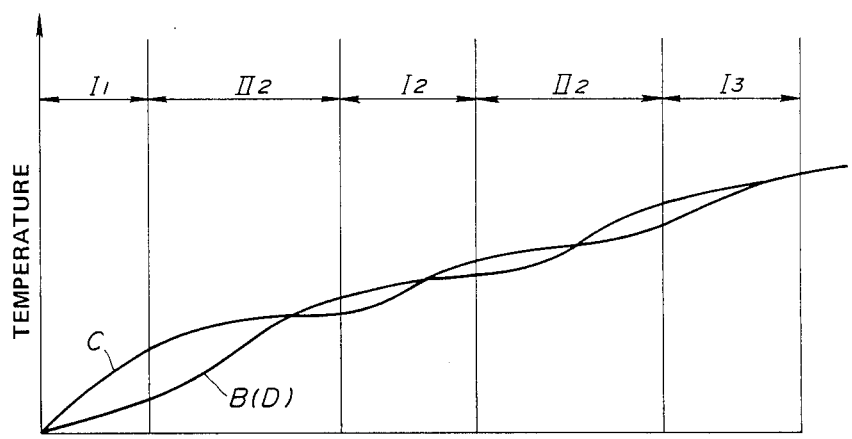

FIG. 29 shows variations in the temperature on the center point C (see FIG. 28) of the workpiece WP and the temperature on the point B or D (see FIG. 28) during the heating operation. As can be seen from FIG. 29, the difference between the temperatures on the points C and B (or D) is relatively small. This stems from the fact that the main and auxiliary heating coil portions are disposed alternatively in the direction of transportation of the workpiece WP. In addition, the difference between the temperatures on the points C and B (or D) can be smaller than obtained in the fourth embodiment of FIG. 24 since the main and auxiliary heating coils are divided in a greater number of portions in this embodiment. Accordingly, there is substantially no stress which may occur to deform or curve the workpiece WP during the heating operation. Therefore, the workpiece WP can be maintained at a constant clearance with respect to the heating coil units, which improves the temperature uniformity over the area of the workpiece WP. In addition, it is possible to increase the heating efficiency by reducing the clearance between the heating coil units through which the workpiece WP is transported.

Figure 30:
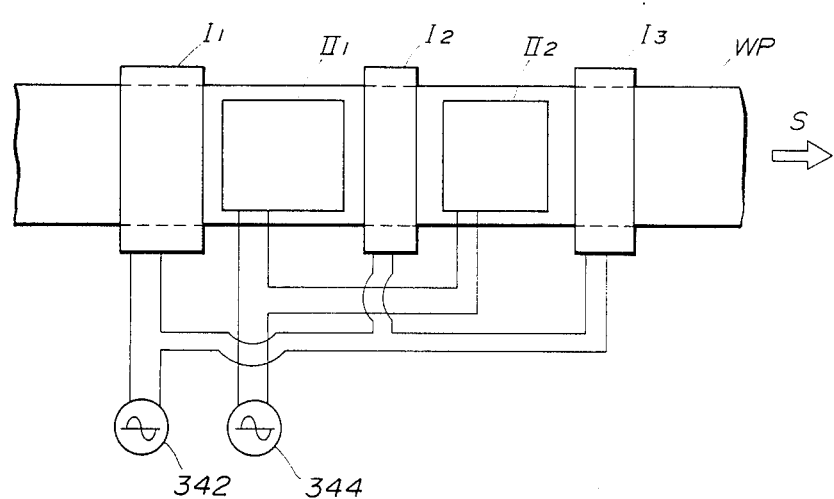
FIG. 30 is a schematic plan view showing another modified form of the heating coil unit of FIG. 24.

Referring to FIG. 30, there is illustrated another modification of the induction heating apparatus which is substantially the same as the modification of FIGS. 27A and 27B except that the first, second and third main heating coils I$_1$, I$_2$ and I$_3$ are connected in series and are supplied with a high- or intermediate-frequency alternating current from a power source 342 and the first and second auxiliary heating coils II$_1$ and II$_2$ are connected in series and are supplied with a high- or intermediate-frequency alternating current from another power source 344. This modification is effective to adjust the alternating current to the auxiliary heating coils independently of the alternating current to the main heating coils 320.

Referring to FIG. 31, there is illustrated a fifth embodiment of the induction heating apparatus of the invention. The induction heating apparatus includes a pair of heating coil units 400 disposed in spaced-parallel relation to each other so that the workpiece WP can be transported between the heating coil units 400 in a direction indicated by the bold arrow S. Each of the heating coil units 400 includes a main heating coil 420 and an auxiliary heating coil 430 disposed on the upstream side of the main heating coil 420. A power source 442 is connected to supply a high- or intermediate-frequency alternating current to the main heating coils 420 to produce rapidly alternating magnetic field crossing the workpiece WP. Another power source 446 is connected to supply a high- or intermediate-frequency alternating current to the auxiliary heating coils 430 to produce rapidly alternating magnetic field crossing the workpiece WP.

The main heating coil 420 includes a pair of spaced-parallel transverse conductors 422 extending in a direction substantially perpendicular to the direction of transportation of the workpiece WP. The transverse conductors 422 are connected in series so that the directions of the AC current flow through adjacent two transverse conductors 422 are opposite. The transverse conductors 422 have a length L longer than the width W of the workpiece WP.

The auxiliary heating coil 430 is disposed on the upstream side of the main heating coil 420 and it has a pair of spaced-parallel longitudinal conductors 432 extending substantially in the same direction as the direction of transportation of the workpiece WP, the longitudinal conductors 432 being placed at positions facing to the workpiece WP at a slight distance inside from the respective opposite side edges of the workpiece WP. The longitudinal conductors 432 are connected in series with each other.

A magnetic shield 470 is provided to cover each of the transverse and longitudinal conductors 422 and 432 except for its one side facing to the workpiece WP in order to minimize the magnetic flux leakage and increase the magnetic flux concentration so as to improve the heating efficiency.

Figure 32A:
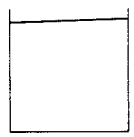
FIGS. 32A to 32C are graphs used in explaining the operatio of the heating coil unit of FIG. 31.
Figure 32B:
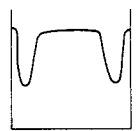
Figure 32C:

The workpiece WP passes the space between the auxiliary heating coils 430 where it is heated to have a temperature curve, as shown in FIG. 32C. As can be seen from FIG. 32C, the temperature curve has two crests which appear at positions adjacent or at a small distance inside from the respective opposite side edges of the workpiece WP. It is to be noted that the temperature at the opposite side edges of the workpiece WP is relatively low in this initial stage of the heating process. Subsequently, the workpiece WP passes the space between the main heating coils 420, which has a heating characteristic as shown in FIG. 32B, where it is heated to compensate for the temperature crests so as to provide temperature uniformity over the full width of the workpiece WP, as shown in FIG. 32A. For this purpose, the distance between the longitudinal conductors 422 is set in such a manner that the temperature crest points (FIG. 32C) corresponds to the respective temperature trough points (FIG. 32B).

If a considerable thermal expansion difference occurs between a high temperature point and a low temperature point during a heating process, strong stresses will occur to compress the part between the high and low temperature points, causing deformations or creases. This is true particularly for workpieces made of carbon steel or the like which is subject to A$_1$ transformation at a temperature around 726° C., causing discontinuous thermal expansion. Although such an undesirable deformation can be avoided to some extent by reducing the difference between the low- and high-temperature portions A and B or E and D (see FIG. 28) in such a manner as described previously, curves and creases would appear at the opposite side edge portions of the workpiece if the opposite side edges, which are free edges subjective to deformation, are heated first to such a high temperature as to lost the material rigidity. This embodiment can avoid such an undesirable deformation by heating the workpiece between the auxiliary heating coils 430 in the initial stage of the heating process and then heating it between the main heating coils 420 in the subsequent stage of the heating process.

Referring to FIG. 33, there is illustrated a modified form of the induction heating apparatus. This modification is substantially the same as the heating coil unit of FIG. 31 except that the main heating coil is divided into two portions each having a pair of spaced-parallel transverse conductors 422 connected in series with each other. These main heating coil portions are supplied with high- or intermediate-frequency alternating currents from respective separated power sources 442 and 443. Accordingly, parts in FIG. 33 which are like those in FIG. 31 have been given like numerals. With this modification, it is possible to reduce the possibility of such undesirable deformation of the workpiece by decreasing the rate at which the opposite side edges of the workpiece WP are heated.

Figure 34:
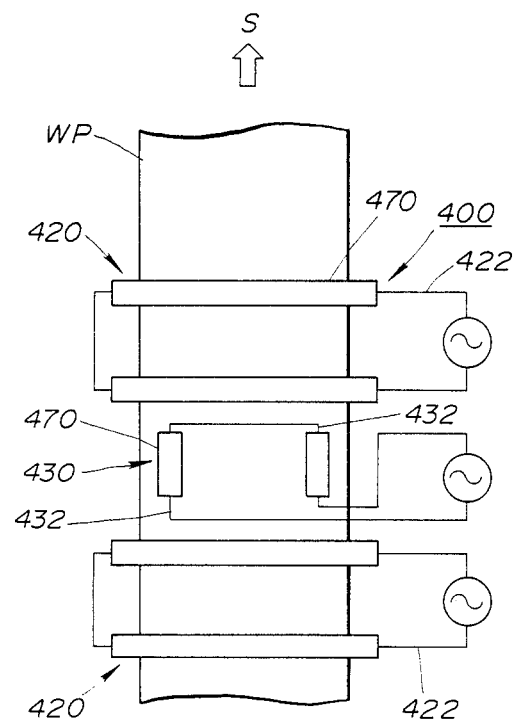
FIG. 34 is a schematic plan view showing another modified form of the heating coil unit of FIG. 31.

Referring to FIG. 34, there is illustrated another modified form of the induction heating apparatus which is substantially the same as the heating coil unit of FIG. 33 except for that the auxiliary heating coil 430 is disposed between the main heating coil first and second portions 420. Accordingly, parts in FIG. 34 which are like those in FIG. 33 have been given like numerals.

Figure 35A:
FIGS. 35A to 35C are graphs used in explaining the operation of the modification of FIG. 34.
Figure 35B:
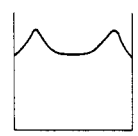
Figure 35C:
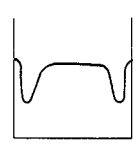

The workpiece WP passes the space between the main heating coil first portions 420 where it is heated to have a temperature curve, as shown in FIG. 35C, the temperature curve having two troughs which appear at a small distance inside from the respective opposite side edges of the workpiece WP. It is to be noted that the temperature at the opposite side edges of the workpiece WP is held at a temperature sufficiently lower than a value above which its rigidity is lost in this first stage of the heating process. Subsequently, the workpiece WP passes the space between the auxiliary heating coils 430. As a result, the workpiece has a temperature curve, as shown in FIG. 35B. Subsequently, the workpiece WP passes the space between the main heating coil second portions where it is heated to provide temperature uniformity over the full width of the workpiece WP, as shown in FIG. 35A. With this embodiment, it is, therefore, possible to reduce the temperature difference between the low- and high-temperature portions of the workpiece during the heating process and also to prevent the opposite side edges of the workpiece from being heated to a high temperature before the inner portion of the workpiece. This is effective to avoid curves and creases which may appear at the opposite side edge portions of the workpiece.

Figure 36:
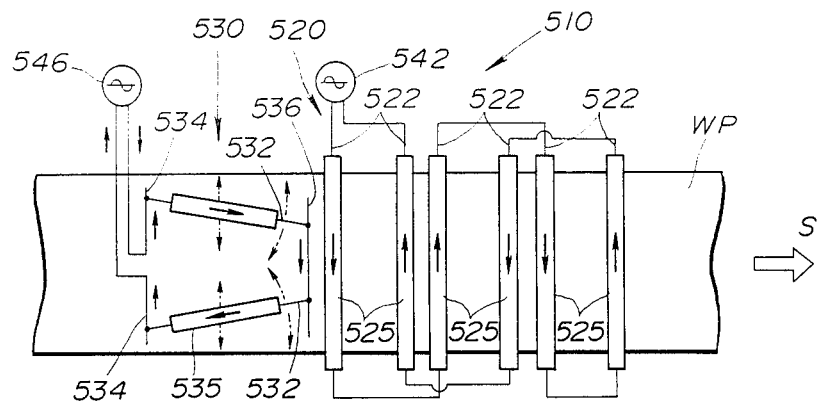
FIG. 36 is a schematic plan view showing a sixth embodiment of the heating coil unit of the invention.

Referring to FIG. 36, there is illustrated a sixth embodiment of the induction heating apparatus of the invention. The induction heating apparatus includes a pair of heating coil units, one of which is shown at 510 in FIG. 36, disposed in spaced-parallel relation to each other so that the workpiece WP can be transported between the heating coil units 510. Each of the heating coil units 510 includes a main heating coil 520 and an auxiliary heating coil 530 placed at a position adjacent to the main heating coil 520. A power source 542 is connected to supply a high- or intermediate-frequency alternating current to the main heating coils 520 to produce magnetic field crossing the workpiece WP. Another power source 546 is connected to supply a high- or intermediate-frequency alternating current to the auxiliary heating coils 530 to produce magnetic field crossing the workpiece WP.

The main heating coil 520 includes a plurality of (in the illustrated case six) spaced-parallel transverse conductors 522 extending in a direction substantially perpendicular to the direction, indicated by the bold arrow S of FIG. 36, of transportation of the workpiece WP. Except for the two outermost transverse conductors 522, the transverse conductor 522 are arranged to form a plurality of pairs each including two transverse conductors 522 placed in close proximity with each other. The transverse conductors 522 are shown as having a length L longer than the width W of the workpiece WP. Each of the transverse conductors 522 may have a magnetic shield 525 mounted thereon. The magnetic shield 525 extends almost the full length of the transverse conductor 522 and has a U-shaped cross section to cover the transverse conductor 522 except for its one side facing to the workpiece WP in order to minimize the magnetic flux leakage and increase the magnetic flux concentration so as to improve the heating efficiency. The transverse conductors 522 are connected in series so that the directions of the AC current flow through adjacent two transverse conductors 522 placed in pair are the same, as shown in FIG. 36. Such an AC current flow produces rapidly alternating magnetic field to induce an electric potential in the workpiece WP, causing heating therein.

The auxiliary heating coil 530 includes a pair of spaced longitudinal conductors 532 extending substantially in the same direction as the direction of transportation of the workpiece WP. One of the longitudinal conductors 532 is placed at a position facing to the workpiece WP at a small distance inside from one of the side edges of the workpiece WP, while the other longitudinal conductor is placed at a position facing to the workpiece WP at a small distance inside from the other side edge of the workpiece WP. The longitudinal conductors 532 are spaced at a distance U from each other, the distance U being shorter than the width W of the workpiece WP. The longitudinal conductors 532 are connected in series with each other by electrical connections 534 and 536 so that the directions of the AC current flow through the two longitudinal conductors 532 are opposite, as shown in FIG. 36. Such an AC current flow produces rapidly alternating magnetic field to induce an electric potential in the workpiece WP, causing heating therein. Each of the longitudinal conductors 532 may have a magnetic shield 535 mounted thereon. The magnetic shield 535 extends almost the full length of the longitudinal conductor 532 and has a U-shaped cross section to cover the longitudinal conductor 532 except for its one side facing to the workpiece WP in order to minimize the magnetic flux leakage and increase the magnetic flux concentration so as to improve the heating efficiency. Both of the longitudinal conductors 532 are coupled between the electrical connections 534 and 536 in such a manner that one longitudinal conductor can move with respect to the other longitudinal conductor to vary the distance U between the longitudinal conductors 532 and also each of the longitudinal conductors can rotate to vary the angle of the longitudinal conductor with respect to the direction of transportation of the workpiece WP.

Figure 37:
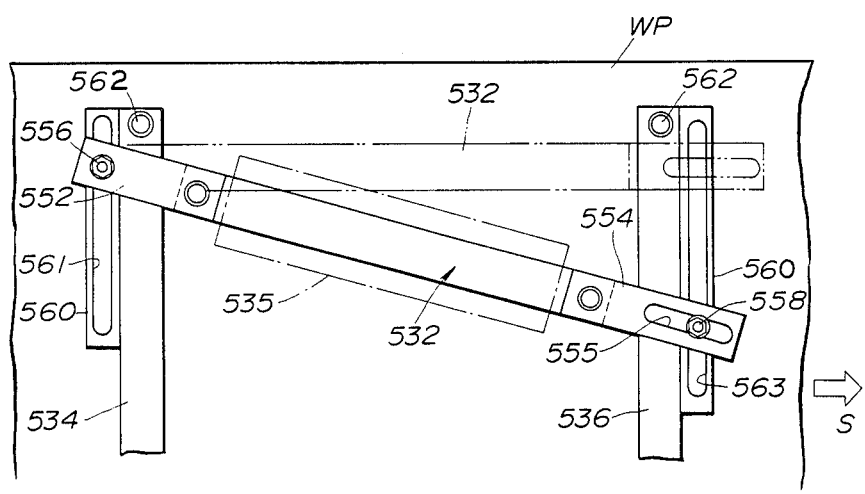
FIG. 37 is a fragmentary plan view showing the manner where the longitudinal conductors are coupled in the heating coil unit of FIG. 36.

Referring to FIG. 37, each of the longitudinal conductors 532 is provided at the opposite ends thereof with first and second extensions 552 and 554. The first extension 552 is formed with a hole for insertion of a bolt 556. The second extension 554 is formed with a slot 555 for insertion of a bolt 558. A mounting frange 560, which is secured on the electrical connection 534, is formed with a slot 561 extending in parallel with the electrical connection 543. Another mounting frange 560, which is secured on the electrical connection 536, is formed with a slot 563 extending in parallel with the electrical connection 536. The first extension 552 is secured on the mounting frange 560 by the bolt 556 and a nut (not shown) fastened on the bolt 556. The second extension 554 is secured on the mounting frange 560 by the bolt 558 and a nut (not shown) fastened on the bolt 558.

Figure 38:
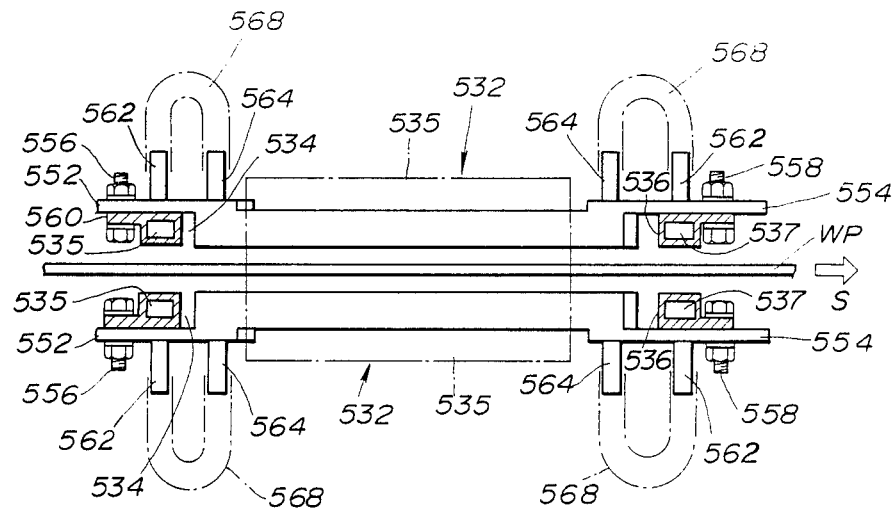
FIG. 38 is a fragmentary sectional view showing the coupling mechanism.

Referring to FIG. 38, each of the electrical connections 534 and 536 is taken in the form of a water-cooled conductor having a coolant passage 535 or 537 extending axially thereof. Although the electrical connection is shown as having a rectangular cross section, it is to be noted that its cross section may have a circular or other suitable shape. The longitudinal conductors 532 may have the same structure as the electrical connections 534 and 536. In this case, it is preferable to connect the coolant passages to form a series connected coolant conduit through which a coolant is circulated so as to dissipate the heat in the auxiliary heating coils 520. The transverse conductors 532 may have the same structure as the electrical connections 534 and 536 for dissipating the heat in the main heating coils 520.

The electrical connection 534 is formed near its opposite ends with ports 562 through which its coolant passage 535 opens to the exterior, the electrical connection 536 is formed near its opposite ends with ports 560, and each of the longitudinal conductors 532 is formed near its opposite ends with ports 564. Coolant hoses 568 are provided to make hydraulic connections between ports 562 and 564 so as to form a series connected coolant conduit in each of the auxiliary heating coils 530.

To move and/or rotate each of the longitudinal conductors 532, the bolts 556 and 558 may be loosened to such an extent that the first and second extensions 552 and 554 can slide on the respective mounting franges 560. After the longitudinal conductor 532 is set at a desired position, the bolts 556 and 558 are tightened again to fix the longitudinal conductor to the electrical connections 534 and 536.

Figure 39A:
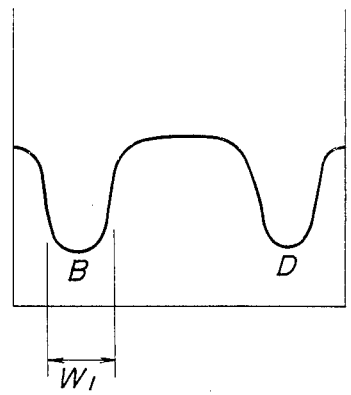
FIGS. 39A and 39B are graphs of temperature versus workpiece width.
Figure 39B:
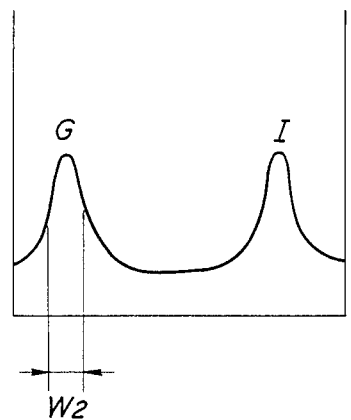

In this embodiment, each of the longitudinal conductors 532 can move with respect to the other longitudinal conductor to vary the distance U between the longitudinal conductors 532 so as to adjust the crest points G and I (FIG. 39B) to positions corresponding to the respective trough points B and D (FIG. 39A). In addition, each of the longitudinal conductors 532 can rotate to vary the angle of inclination of the longitudinal conductor with respect to the direction of transportation of the workpiece WP in such a manner that the width W2 of the crest G or I (see FIG. 39B) of the temperature curve provided by the auxiliary heating coils arranged in pair can be equalized to the width W1 of the trough B or D (see FIG. 39A) provided by the main heating coils arranged in pair, thereby adjusting the density of energy inducted in the workpiece WP transported between the auxiliary heating coils 530. The greater then angle at which the longitudinal conductor is inclined with respect to the direction of transportation of the workpiece, the smaller the induced energy per unit area and the lower the temperature, indicated by the height of the crest G or I of FIG. 39B, of the workpiece heated between the auxiliary heating coils 530. It is, therefore, possible to provide uniform temperature distribution over the full width of the workpiece WP by adjusting the width W2 and height of the crests G and I provided by the auxiliary heating coils 530 arranged in pair.

Figure 40:
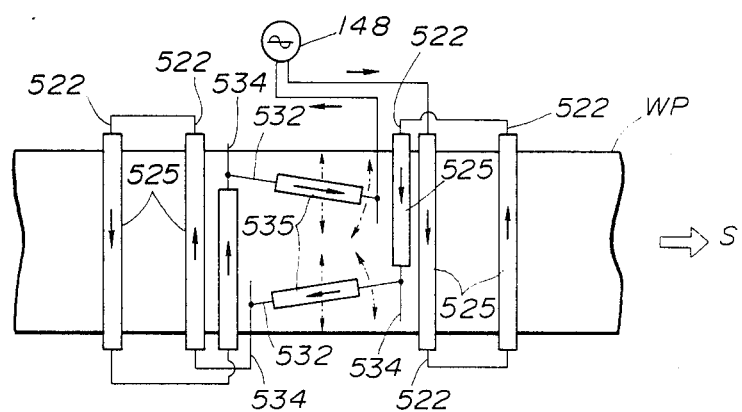
FIG. 40 is a schmetic plan view showing a modified form of the heating coil unit of FIG. 36.

Referring to FIG. 40, there is illustrated a modified form of the induction heating apparatus which is substantially the same as shown and described in connection with FIG. 36 except for the heating coil connection. Accordingly, parts in FIG. 40 which are like those in FIG. 36 have been given like reference numerals. In this modification, the main heating coil 520 are divided into first and second portions between which the auxiliary heating coil 530 is disposed. The main and auxiliary heating coils 520 and 530 are connected in series, as shown in FIG. 40, and are supplied with a high- or intermediate-frequency alternating current from a single power source 148. The longitudinal conductors 532 are coupled between the electrical connections 534 substantially in the same manner as described in connection with FIGS. 37 and 38 so that each of the longitudinal conductors 535 can be inclined at a desired angle with respect to the direction of transportation of the workpiece WP.

Referring to FIG. 41, there is illustrated another modified form of the induction heating apparatus which is substantially the same as shown and described in connection with FIG. 36 except for the heating coil connection. Accordingly, parts in FIG. 41 which are like those in FIG. 36 have been given like reference numerals. In this modification, the auxiliary heating coil 530 is connected in series with the main heating coil 520 and is supplied with a high- or intermediate-frequency alternating current from a single power source 148. Although the auxiliary heating coil 530 is shown as positioned on the downstream side of the main heating coil 520, it is to be noted that it may be positioned on the upstream side of the main heating coil 520.

Figure 42:
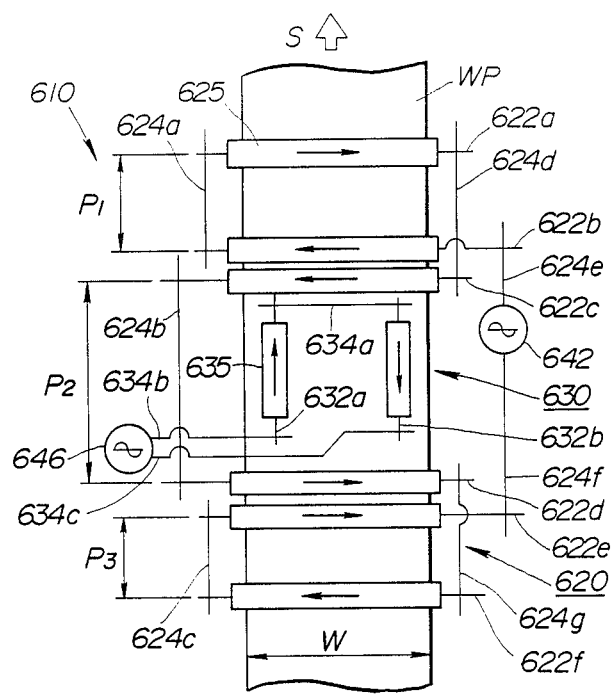
FIG. 42A is a schematic plan view showing a seventh embodiment of the heating coil unit of the invention.
FIG. 42B is an enlarged fragmentary plan view showing the manner where the coil conductor is coupled.
Figure 42:
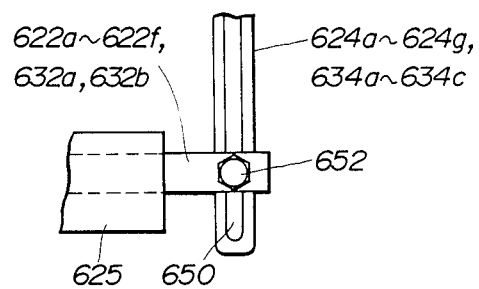

Referring to FIG. 42A, there is illustrated a seventh embodiment of the induction heating apparatus of the invention. The induction heating apparatus includes a pair of heating coil units, one of which is shown at 610 in FIG. 42A, disposed in spaced-parallel relation to each other so that the workpiece WP can be transported between the heating coil units 610. Each of the heating coil units 610 includes a main heating coil 620 and an auxiliary heating coil 630.

The main heating coil 620 is divided into first and second portions each having a plurality of (in the illustrated case three) spaced-parallel transverse conductors extending in a direction substantially perpendicular to the direction, indicated by the bold arrow S of FIG. 42A. The transverse conductors have a length L longer than the width W of the workpiece WP. The numerals 624a to 624d indicate connection conductors used to connect the transverse conductors 622a to 622f in series, as shown in FIG. 42A. A power source 642 is connected to supply a high- or intermediate-frequency alternating current to the main heating coils 620 to produce magnetic field crossing the workpiece WP. Such magnetic field induces an electric potential in the workpiece WP, causing heating therein. A magnetic shield 625 is provided on each of the transverse conductors 622a to 622f. The magnetic shield 625 extends almost the full length of the transverse conductor and has a U-shaped cross section to cover the transverse conductor except for its one side facing to the workpiece WP in order to minimize the magnetic flux leakage and increase the magnetic flux concentration so as to improve the heating efficiency.

Referring to FIG. 42B, each of the connection conductors 624a to 624g is formed with a slot 650 extending in parallel with the direction of transportation of the workpiece WP. A bolt 652 is used to secure one end of the transverse conductor to the corresponding connection conductor. The bolt 652 is inserted into the slot 650 from one side of the connection and it engages with a nut (not shown) on the other side of the connection conductor.

Returning to FIG. 42A, the auxiliary heating coil 630 is disposed between the first and second portions of the main heating coil 620 and it includes a pair of spaced-parallel longitudinal conductors 632a and 632b extending substantially in the same direction as the direction of transportation of the workpiece WP. One of the longitudinal conductors is placed at a position facing to the workpiece WP at a small distance inside from one of the side edges of the workpiece WP, while the other longitudinal conductor is placed at a position facing to the workpiece WP at a small distance inside from the other side edge of the workpiece WP. The longitudinal conductors 632 are spaced at a distance U from each other, the distance U being shorter than the width W of the workpiece WP. The longitudinal conductors 632a and 632b are connected in series with each other by means of an electrical connection 64a and is connected in series with a power source 646 by means of connection conductors 634b and 634c. The power source 646 supplies a high- or intermediate-frequency alternating current to produce rapidly alternating magnetic field to induce an electric potential in the workpiece WP, causing heating therein. Each of the connection conductors 634a, 634b and 634c has the same structure as shown in FIG. 42B, so that the distance U between the longitudinal conductors 632a and 632b can be adjusted to a desired value. Each of the longitudinal conductors 632a and 632b may have a magnetic shield 635 mounted thereon. The magnetic shield 635 extends almost the full length of the longitudinal conductor and has a U-shaped cross section to cover the longitudinal conductor except for its one side facing to the workpiece WP in order to minimize the magnetic flux leakage and increase the magnetic flux concentration so as to improve the heating efficiency.

The applicants have found that the temperature at the center of the workpiece WP is lower than the temperature at the opposite side edges of the workpiece when the pitch P1, P3 of the transverse conductors of the main coil is greater than a reference pitch or when the width W of the workpiece WP is shorter than a reference width and that the temperature at the center of the workpiece WP is higher than the temperature at the opposite side edges of the workpiece WP when the pitch of the transverse conductors of the main heating coil is smaller than the reference pitch or when the width W of the workpiece WP is longer than the reference width. In this embodiment, the transverse conductor pitch P1, P3 can be changed freely. It is, therefore, possible to provide uniform temperature distribution over the full width of the workpiece WP by increasing the transverse conductor pitch for a broader workpiece in which longer induced current transverse paths appear and by decreasing the transverse conductor pitch for a narrower workpiece in which relatively shorter induced current transverse paths appear. It is to be noted, of course, that this invention may be used to adjust the temperature of the center of the workpiece at a value difference from the temperature at the side edges of the workpiece. In addition, the longitudinal conductors 632a and 632b can be moved to vary the distance U between the longitudinal conductors.

To change the pitch of the transverse conductors or the distance between the longitudinal conductors, the bolts 652 may be loosened to such an extent that each of the transverse or longitudinal conductors can slide on the corresponding connection conductors. After a desired transverse conductor pitch or a desired longitudinal conductor distance is set, the bolts are tightened again to fix the transverse or longitudinal conductor to the connection conductors.

Referring to FIG. 43, there is illustrated another modified form of the induction heating apparatus which is substantially the same as shown and described in FIGS. 42A and 42B except that the auxiliary heating coil 630 is disposed on the downstream side of the main heating coil 620. Accordingly, parts in FIG. 43 which are like those in FIGS. 42A and 42B have been given like reference numerals. In this modification, the auxiliary heating coil 630 is shown as having a pair of longitudinal conductors 632a and 632b movable to adjust the angle at which they are inclined with respect to the direction of transportation of the workpiece WP substantially in the same manner as described in connection with FIGS. 37 and 38.

It is, therefore, apparent from the foregoing that there has been provided, in accordance with the invention, an improved induction heating apparatus which can heat a workpiece with good temperature uniformity over the full width of the workpiece. The induction heating apparatus includes auxiliaty heating coils disposed at a position adjacent to respective main heating coils for compensating the temperature ununiformity provided by the main heating coils. In addition, at least one of the longitudinal conductors of each of the auxiliary heating coils is adapted to move with respect to the other longitudinal conductor. This is effective to adjust the distance between the longitudinal conductors for applications to another workpiece having a different width.

It is to be noted that the inducation heating apparatus shown and described in connection with the above embodiments is of the transverse flux heating type where the main heating coils included in the respective heating coil units constitute a main heating coil unit, the transverse conductors included in one of the main heating coils being disposed at positions facing to the corresponding transverse conductors included in the other main heating coil to produce magnetic flux crossing the transported workpiece in a direction substantially perpendicular to the surface of the workpiece when the main heating coil unit is powered by the power source. Similarly, the auxiliary heating coils included in the respective heating coil units constitute an auxiliary heating coil unit, the longitudinal conductors included in one of the auxiliary heating coils being disposed at positions facing to the corresponding longitudinal conductors included in the other auxiliary heating coil to produce magnetic flux crossing the transported workpiece in a direction substantially perpendicular to the surface of the workpiece when the auxiliary heating coil unit is powered by the power source.

While the invention has been described in conjunction with specific embodiments thereof, it is evident that many alternatives, modifications and variations will be apparent to those skilled in the art. For example, the control unit is optional and may be removed from the induction heating apparatus. The magnetic shield are also optional and may be removed. Accordingly, it is intended to embrace all alternatives, modifications and variations that fall within the scope of the appended claims.

What is claimed is:

1. An induction heating apparatus of a transverse flux heating type inductively heating a sheet-formed workpiece transported through the apparatus in a direction, the workpiece having a substantially uniform width defined by opposed side edges, comprising:

a power source unit for supplying alternating current at a predetermined frequency; and at least one set of a main heating coil unit having a pair of heating coils disposed in spaced-parallel relation to permit transportation of the workpiece between the main heating coils, and an auxiliary heating coil unit having a pair of auxiliary heating coils disposed in spaced-parallel relation to permit transportation of the workpiece between the auxiliary heating coils;

each of the main heating coils having a plurality of transverse conductors extending in a transverse direction substantially perpendicular to the direction of transportation of the workpiece, the transverse conductors having a length longer than the width of the workpiece, the transverse conductors being connected in series with the power source unit for producing magnetic field crossing the workpiece; and each of the auxiliary heating coils having first and second longitudinal conductors extending in a longitudinal direction substantially the same as the direction of transportation of the workpiece with a transverse distance shorter than the width of the workpiece, the first longitudinal conductor being placed at a position facing to the workpiece at a slight distance inside from one of the side edges of the workpiece, the second longitudinal conductor being placed at a position facing to the workpiece at a slight distance inside from the other side edge of the workpiece, the first and second longitudinal conductors being connected in series with the power supply unit for producing magnetic field crossing the workpiece.

2. The induction heating apparatus as claimed in claim 1, wherein a magnetic shield is provided to cover each of the transverse and longitudinal conductors except for its one side facing to the workpiece.

3. The induction heating apparatus as claimed in claim 1, wherein each of the transverse and longitudinal conductors is a water-cooled conductor for dissipating heat in the conductor.

4. The induction heating apparatus as claimed in claim 1, wherein each the auxiliary heating coil includes means for manually adjusting the transverse distance between the first and second longitudinal conductors.

5. The induction heating apparatus as claimed in claim 1, wherein each the main heating coil and each the auxiliary heating coil are connected in series.

6. The induction heating apparatus as claimed in claim 1, wherein the power source unit includes first and second power sources each supplying alternating current, the first power source being connected in series with each the main heating coil, the second power source being connected in series with each the auxiliary heating coil.

7. The induction heating apparatus as claimed in claim 1, wherein each the auxiliary heating coil includes a pair of transverse conductors disposed in spaced-parallel relation to each other and connected to the first and second longitudinal conductors to form a one-turn coil connected in series with the power source unit.

8. The induction heating apparatus as claimed in claim 1, wherein each the main heating coil is divided into a plurality of portions, the auxiliary heating coil being divided into a plurality of portions disposed alternatively in the direction of transportation of the workpiece with the main heating coil portions.

9. The induction heating apparatus as claimed in claim 8, wherein the power source unit includes first and second power sources each generating alternative current at a predetermined frequency, the first power source being connected in series with each the main heating coil, the second power source being connected in series with each the auxiliary heating coil.

10. The induction heating apparatus as claimed in claim 8, wherein each the auxiliary heating coil is divided into first and second portions, the first portion having the first longitudinal conductor, the second portion having the second longitudinal conductor.

11. The induction heating apparatus as claimed in claim 1, wherein each the auxiliary heating coil is divided into first and second portions, the first portion having the first longitudinal conductor, the second portion having the second longitudinal conductor.

12. The induction heating apparatus as claimed in claim 1, wherein each the main heating coil is divided into first and second portions disposed on the opposite sides of the auxiliary heating coil.

13. The induction heating apparatus as claimed in claim 12, wherein the power source unit includes first and second power sources each generating alternating current at a predetermined frequency, the first power source being connected in series with each the main heating coil, the second power source being connected in series with each the auxiliary heating coil.

14. The induction heating apparatus as claimed in claim 1, wherein each the main heating coil is disposed on the downstream side of the auxiliary heating coil.

15. The induction heating apparatus as claimed in claim 14, wherein each the main heating coil is divided into first and second portions connected to individual power sources for supplying a high- or intermediate-frequency alternating current;

16. The induction heating apparatus as claimed in claim 1, wherein each of the first and second longitudinal conductors is inclined at an angle with respect to the direction of transportation of the workpiece.

17. The induction heating apparatus as claimed in claim 16, wherein each the auxiliary heating coil includes means for manually adjusting the angle of inclination of each of the first and second longitudinal conductors with respect to the direction of transportation of the workpiece.

18. The induction heating apparatus as claimed in claim 16, wherein each the main heating coil is disposed on the downstream side of the auxiliary heating coil.

19. The induction heating apparatus as claimed in claim 16, wherein each the main heating coil is divided into first and second portions disposed on the opposite sides of the auxiliary heating coil.

20. The induction heating apparatus as claimed in claim 16, where each the auxiliary heating coil is disposed on the downstream side of the main heating coil.

21. The induction heating apparatus as claimed in claim 1, wherein each the main heating coil has at least one pair of transverse conductors arranged at a pitch.

22. The induction heating apparatus as claimed in claim 21 wherein each the main heating coil includes means for manually adjusting the pitch provided between the adjacent two transverse conductors through which AC current flows in opposite direction.

23. The induction heating apparatus as claimed in claim 22, wherein each the main heating coil is divided into two portions disposed on the opposite sides of the auxiliary heating coil.

24. The induction heating apparatus as claimed in claim 22, wherein each the auxiliary heating coil unit including means for manually adjusting the transverse distance between the first and second longitudinal conductors.

25. The induction heating apparatus as claimed in claim 22, wherein each of the first and second longitudinal conductors is inclined at an angle with respect to the direction of transportation of the workpiece.

26. The induction heating apparatus as claimed in claim 25, wherein each the auxiliary heating coil includes means for manually adjusting the angle of inclination of each of the first and second longitudinal conductors with respect to the direction of transportation of the workpiece.

27. The induction heating apparatus as claimed in claim 1, wherein each the main heating coil is divided into a plurality of portions one of which is disposed on the downstream side of the other main heating coil portions and on the downstream side of the auxiliary heating coil.

28. The induction heating apparatus as claimed in claim 1, which comprises a control unit for adjusting the heating coil units to a predetermined position with respect to the workpiece.

29. The induction heating apparatus as claimed in claim 28, wherein the control unit includes a position sensor for sensing the position of the workpiece to generate a sensor signal indicative of the sensed workpiece position, means for generating a control signal indicative of a target position, means responsive to the sensor and control signals for determining an error between the sensed position and the target position, and means for moving the heating coil units to zero the error.

* * * * *